(12) United States Patent
Oh

(10) Patent No.: US 10,634,839 B2
(45) Date of Patent: Apr. 28, 2020

(54) LIQUID CRYSTAL DISPLAY DEVICE AND ELECTRONIC DEVICE COMPRISING THE SAME

(71) Applicant: LG Display Co., Ltd., Seoul (KR)

(72) Inventor: KeumYoung Oh, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/806,838

(22) Filed: Nov. 8, 2017

(65) Prior Publication Data

US 2018/0149794 A1 May 31, 2018

(30) Foreign Application Priority Data

Nov. 30, 2016 (KR) .................. 10-2016-0161553

(51) Int. Cl.
  *F21V 8/00* (2006.01)
  *G02F 1/1333* (2006.01)
  *G02F 1/1335* (2006.01)
  *G02F 1/13357* (2006.01)

(52) U.S. Cl.
  CPC ......... *G02B 6/0036* (2013.01); *G02B 6/0051* (2013.01); *G02B 6/0053* (2013.01); *G02B 6/0055* (2013.01); *G02B 6/0058* (2013.01); *G02B 6/0061* (2013.01); *G02B 6/0068* (2013.01); *G02B 6/0083* (2013.01); *G02F 1/133308* (2013.01); *G02F 1/133615* (2013.01); *G02F 2001/133331* (2013.01)

(58) Field of Classification Search
  CPC ......... G02F 1/133308; G02F 1/133524; G02F 2001/133331; G02B 6/0036; G02B 6/0051; G02B 6/0053; G02B 6/0055; G02B 6/0058; G02B 6/0068
  See application file for complete search history.

(56) References Cited

U.S. PATENT DOCUMENTS

| | | | | |
|---|---|---|---|---|
| 6,845,212 B2* | 1/2005 | Gardiner | ............. | G02B 6/0038 359/619 |
| 2008/0123364 A1* | 5/2008 | Chang | ................. | G02B 6/0016 362/608 |
| 2008/0239204 A1* | 10/2008 | Lee | ...................... | G02B 6/0036 349/65 |
| 2014/0218967 A1* | 8/2014 | Kuroki | ..................... | H01J 1/63 362/612 |
| 2015/0316705 A1* | 11/2015 | Chen | .................... | G02B 6/0063 362/613 |

* cited by examiner

Primary Examiner — Nathanael R Briggs
(74) Attorney, Agent, or Firm — Morgan, Lewis & Bockius LLP

(57) ABSTRACT

Disclosed is an LCD device with a sub screen capable of minimizing power consumption for a driving mode of the sub screen, and an electronic device comprising the same, wherein the LCD device includes a liquid crystal display panel, and a backlight unit including a light guiding plate for guiding light from a light source toward the liquid crystal display panel, wherein the light guiding plate includes a base member having a first light-emission portion, and a second light-emission portion adjacent to the first light-emission portion, a first optical pattern part prepared in some area of the first light-emission portion adjacent to the second light-emission portion, and a second optical pattern part prepared in the second light-emission portion.

23 Claims, 14 Drawing Sheets

LIQUID CRYSTAL DISPLAY DEVICE AND ELECTRONIC DEVICE COMPRISING THE SAME

CROSS REFERENCE TO RELATED APPLICATIONS

This application claims the benefit of the Korean Patent Application No. filed on 10-2016-0161553 filed on Nov. 30, 2016, which is hereby incorporated by reference as if fully set forth herein.

BACKGROUND

Technical Field

Embodiments of the present invention relate to a liquid crystal display device, and an electronic device comprising the same.

Discussion of the Related Art

Generally, a liquid crystal display (LCD) device is widely used for a display screen of various devices such as television, notebook computer, monitor, camera, camcorder, or home appliances with display as well as mobile electronic devices such as a smart phone, a smart watch, a watch phone, a wearable device, a tablet personal computer (PC), and a mobile communication terminal.

According as an electronic device with LCD device, for example, a smart phone has been widely used, various requirements for new functions of the smart phone are increasing.

Recently, a smart phone having a sub screen provided in a predetermined part of a main display screen without a physical screen division has been introduced. In case of this smart phone, time information and various application icons are displayed on the sub screen for a standby mode or a normal driving mode. Thus, time information may be displayed on the sub screen regardless of standby mode or normal driving mode, and the various applications may be rapidly executed for the standby mode or normal driving mode.

However, in case of the smart phone having the sub screen, even though an image is displayed only on the sub screen defined in the predetermined part of the main display screen, all light sources of a backlight unit are driven at the same time, which causes a problem of high power consumption for the driving of the sub screen.

SUMMARY

Accordingly, embodiments of the present invention are directed to a liquid crystal display (LCD) device that substantially obviates one or more problems due to limitations and disadvantages of the related art, and an electronic device comprising the same.

An aspect of the present disclosure is to provide an LCD device with a sub screen which is capable of minimizing power consumption for a driving mode of the sub screen, and an electronic device comprising the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, a liquid crystal display (LCD) device comprises a liquid crystal display panel, and a backlight unit including a light guiding plate for guiding light from a light source toward the liquid crystal display panel, wherein the light guiding plate includes a base member having a first light-emission portion, and a second light-emission portion adjacent to the first light-emission portion, a first optical pattern part prepared in some area of the first light-emission portion adjacent to the second light-emission portion, and a second optical pattern part prepared in the second light-emission portion.

In another aspect, an electronic device comprises a housing having a receiving space therein; a liquid crystal display module received in the receiving space; and a cover window for covering the liquid crystal display module, wherein the cover window is supported by the housing, wherein liquid crystal display module includes a liquid crystal display device comprising a liquid crystal display panel and a backlight unit having a light guiding plate including a base member having a first light-emission portion, and a second light-emission portion adjacent to the first light-emission portion, a first optical pattern part prepared in some area of the first light-emission portion adjacent to the second light-emission portion, and a second optical pattern part prepared in the second light-emission portion.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the disclosure and together with the description serve to explain the principles of embodiments of the invention. In the drawings.

DETAILED DESCRIPTION

Figure 1:
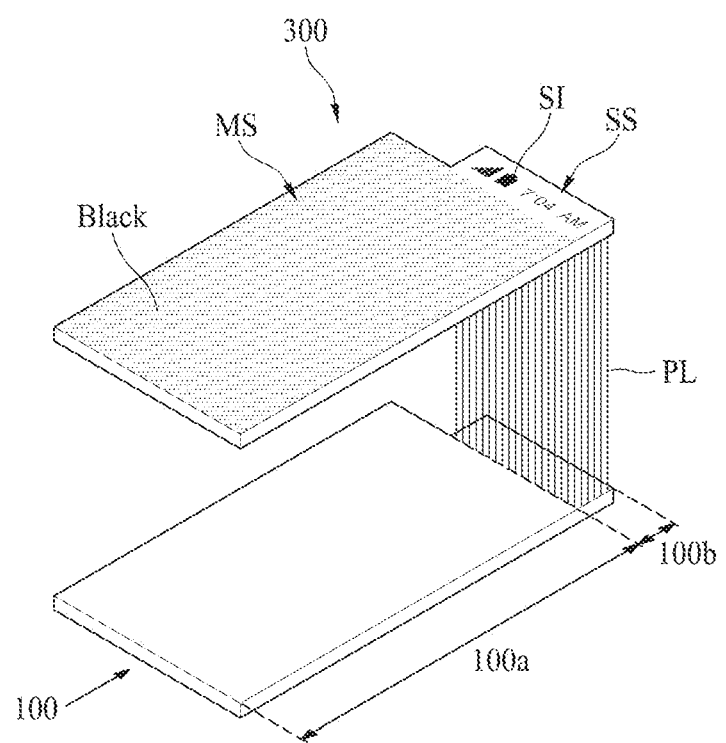
FIG. 1 illustrates an LCD device according to the embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error region although there is no explicit description.

In describing a position relationship, for example, when the positional order is described as 'on~', 'above~', 'below~', and 'next~', a case which is not contact may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Also, it should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, a liquid crystal display (LCD) device according to the embodiment of the present invention and an electronic device comprising the same will be described in detail with reference to the accompanying drawings.

FIG. 1 illustrates an LCD device according to one embodiment of the present invention.

Referring to FIG. 1, the LCD device 10 according to the embodiment of the present invention may include a backlight unit 100 and a liquid crystal display panel 300.

The liquid crystal display panel 300 may include a main screen (MS) and a sub screen (SS) which are not physically separated but spatially separated from each other.

The main screen (MS) is relatively larger than the sub screen (SS). A main image including a text, image, or video is displayed on the main screen (MS).

The sub screen (SS), which is relatively smaller than the main screen (MS), is prepared on a predetermined area of the main screen (MS). A sub image (SI) including time information and various application ions selected for a rapid execution may be displayed on the sub screen (SS). For example, the sub screen (SS) may be selectively displayed by an on-state of the main screen (MS), an off-state of the main screen (MS), or a standby state of an electronic device.

The backlight unit 100 is disposed in the rear of the liquid crystal display panel 300. According as the liquid crystal display panel 300 is driven, the backlight unit 100 emits light to at least one of the main screen (MS) and the sub screen (SS). The backlight unit 100 according to one embodiment of the present invention may include a first light-emission portion 100a overlapped with the main screen (MS), and a second light-emission portion 100b overlapped with the sub screen (SS).

The first light-emission portion 100a and the second light-emission portion 100b respectively guide light, which are supplied from the different light sources, to the main screen (MS) and the sub screen (SS). In this case, the first light-emission portion 100a and the second light-emission portion 100b are physically connected with each other, and optically separated from each other, whereby the first light-emission portion 100a changes a light advancing path of the light emitted from the first light source, and guides the light only toward the main screen (MS), and the second light-emission portion 100b changes a light advancing path of the light emitted from the second light source, and guides the light only toward the sub screen (SS). For example, if driving only the sub screen (SS) of the liquid crystal display panel 300, the backlight unit 100 turns off the first light source, and turns on the second light source, whereby the sub screen (SS) is irradiated with the partial light (PL) through the second light-emission portion 100b. Accordingly, the main screen (MS) of the liquid crystal display panel 300 is in a black state, and the sub image is displayed on the sub screen (SS) of the liquid crystal display panel 300.

Additionally, the backlight unit 100 divides the main screen (MS) into a plurality of divided portions, and provides the light with the adjusted luminance to each of the divided portions of the main screen (MS) by a local dimming driving method based on the luminance for each divided portion. In this case, it is possible to reduce power consumption of the backlight unit 100 for driving the main screen (MS).

In the LCD device according to the embodiment of the present invention, the sub screen (SS) is irradiated with the light through the partial light emission of the backlight unit 100, to thereby minimize power consumption for driving the sub screen (SS).

Figure 2:
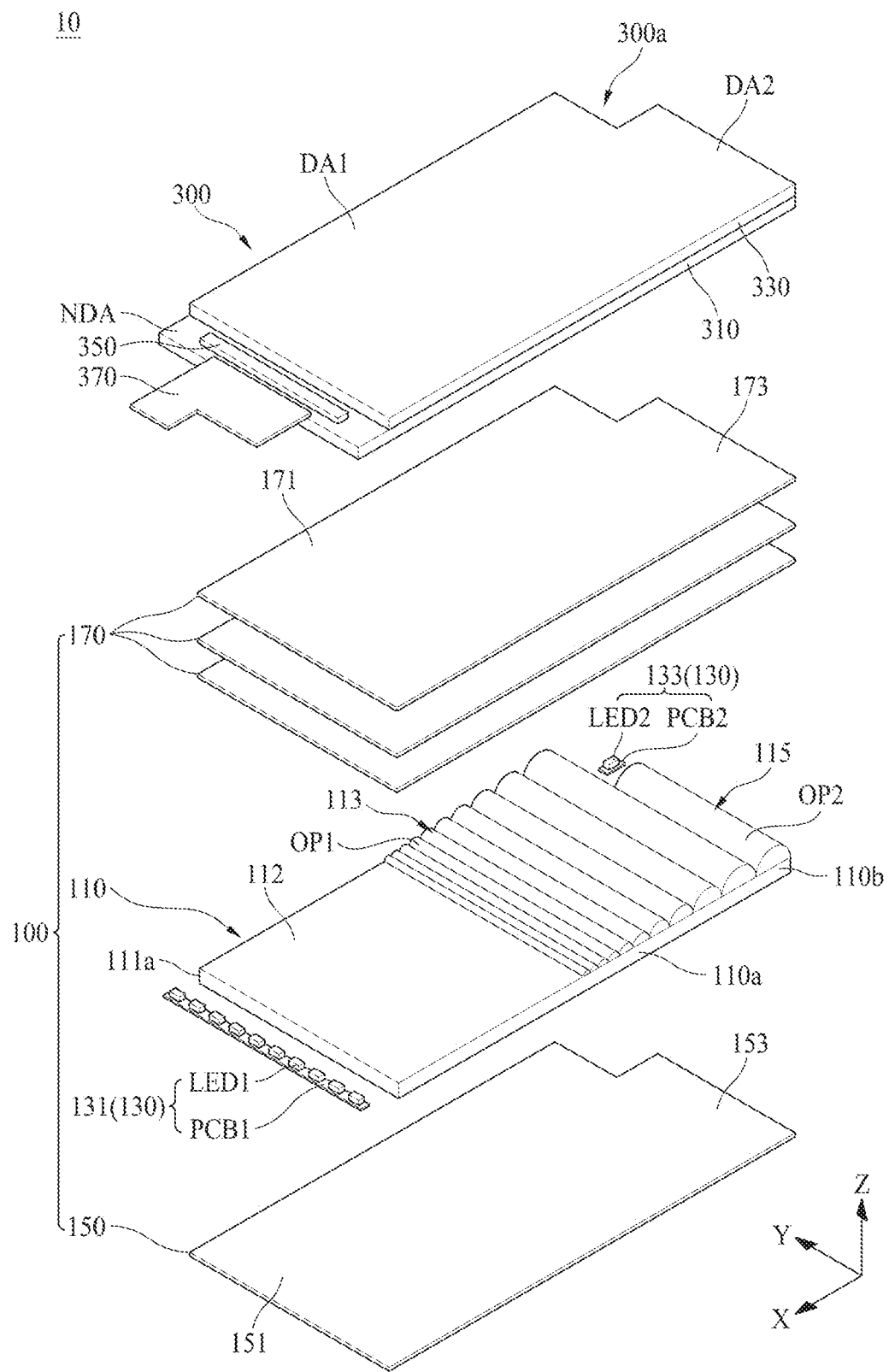
FIG. 2 is an exploded perspective view illustrating an LCD device according to one embodiment of the present invention.
Figure 3:
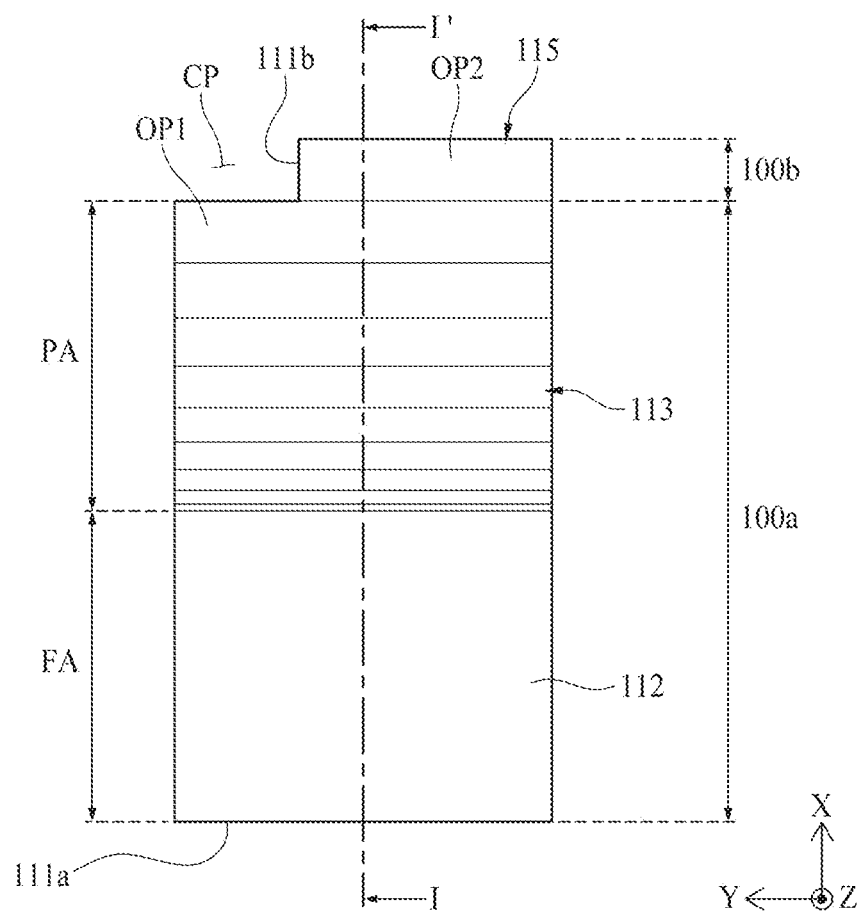
FIG. 3 is a plane view illustrating a light guiding plate of FIG. 2.
Figure 4:
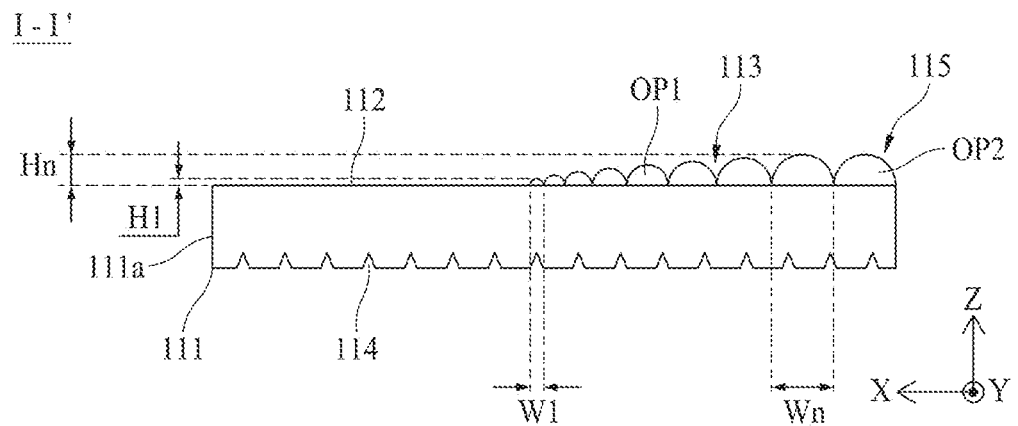
FIG. 4 is a cross sectional view along I-I' of FIG. 3.

FIG. 2 is an exploded perspective view illustrating an LCD device according to one embodiment of the present invention. FIG. 3 is a plane view illustrating a light guiding plate of FIG. 2. FIG. 4 is a cross sectional view along I-I' of FIG. 3.

Referring to FIGS. 2 to 4, the LCD device 10 according to one embodiment of the present invention may include a liquid crystal display module having a backlight unit 100, and a liquid crystal display panel 300.

The backlight unit 100 according to one embodiment of the present invention may include a light guiding plate 110, a light source 130, a reflective sheet 150, and an optical sheet portion 170.

The light guiding plate 110 guides light emitted from the light source 130 to the liquid crystal display panel 300. The light guiding plate 110 according to one embodiment of the present invention may include a base member 111, a first optical pattern part 113, and a second optical pattern part 115.

The base member 111 may include a light transmitting plastic material or a glass material.

The base member 111 according to one embodiment of the present invention may include a first light-emission portion 100a, and a second light-emission portion 100b adjacent to the first light-emission portion 100a. The first light-emission portion 100a is relatively larger than the second light-emission portion 100b. The second light-emission portion 100b is not physically separated but spatially separated from the first light-emission portion 100a, and the second light-emission portion 100b is relatively smaller than the first light-emission portion 100a.

The base member 111 according to one embodiment of the present invention may include a first light-incidence surface 111a prepared at one side of the first light-emission portion 100a, and a second light-incidence surface 111b prepared at one side of the second light-emission portion 100b.

The base member 111 according to one embodiment of the present invention may include a first light guiding portion 110a, and a second light guiding portion 110b.

The first light guiding portion 110a may be formed in shape of a rectangular parallelepiped having first and second long sides with constant thickness and length, first and second short sides with constant thickness and length, and lower and upper surfaces with constant size. The first light guiding portion 110a may include the first light-emission portion 100a and the first light-incidence surface 111a. The first light-incidence surface 111a is prepared at the first short side of the first light guiding portion 110a. The first light-emission portion 100a is prepared on an upper surface of the first light guiding portion 110a confronting the optical sheet portion 170. The first light guiding portion 110a guides light which is incident on the first light-incidence surface 111a toward the liquid crystal display panel 300 so that a predetermined area of the divided portion of the liquid crystal display panel 300 is locally irradiated with the light, which enables a local dimming driving method of the liquid crystal display panel 300. In this case, the light which is incident on the first light-incidence surface 111a is total internally reflected, refracted, and scattered in the first light guiding portion 110a, and is then provided to the liquid crystal display panel 300 through the first light-emission portion 100a.

Additionally, the first light guiding portion 110a may further include an engrave pattern or dot pattern 114 prepared on a lower surface of the light guiding plate 110 directly confronting the reflective sheet 150. In this case, the engrave pattern or dot pattern 114 reflects or refracts the incident light, to thereby improve a light emission efficiency.

The second light guiding portion 110b is not physically separated but spatially separated from the first light guiding portion 110a, and the second light guiding portion 110b is relatively smaller than the first light guiding portion 110a. For example, the second light guiding portion 110b may protrude (or extend) from the second short side of the first light guiding portion 110a along the first direction (X) which is parallel to a length direction of the long side of the first light guiding portion 110a. In another example, the second light guiding portion 110b is prepared at the other side of the first light guiding portion 110a which is parallel to one side (or first short side) of the first light guiding portion 110a, wherein one portion (CP) of the second short side of the first light guiding portion 110a may be removed, or one corner portion (CP) where one end of the second short side of the first light guiding portion 110a meets with one end of the first long side of the first light guiding portion 110a may be removed by a constant size. The second light guiding portion 110b may include a first short side which is parallel to the first long side of the first light guiding portion 110a, a second short side which extends from the second long side of the first light guiding portion 110a, and a long side which is parallel to the first short side of the first light guiding portion 110a. In this case, the long side of the second light guiding portion 110b is shorter than the first short side of the first light guiding portion 110a.

Herein, one corner portion (CP) of the first light guiding portion 110a may be used as a space for a camera module to be loaded onto the electronic device.

The second light guiding portion 110b may include the second light-emission portion 100b and the second light-incidence surface 111b. The second light-incidence surface 111b is prepared at the first short side of the second light guiding portion 110b, and is disposed between the first long side of the first light guiding portion 110a and the second long side of the first light guiding portion 110a. The second light-emission portion 100b is prepared on an upper surface of the second light guiding portion 110b confronting the optical sheet portion 170. The second light guiding portion 110b guides light which is incident on the second light-incidence surface 111b toward the liquid crystal display panel 300 so that the remaining area of the divided portion of the liquid crystal display panel 300 is locally irradiated with the light, which enables a local dimming driving method of the liquid crystal display panel 300. In this case, the light which is incident on the second light-incidence surface 111b is total internally reflected, refracted, and scattered in the second light guiding portion 110b, and is then provided to the liquid crystal display panel 300 through the second light-emission portion 100b.

Additionally, the second light guiding portion 110b may further include an engrave pattern or dot pattern 114 prepared on a lower surface of the light guiding plate 110 directly confronting the reflective sheet 150. In this case, the engrave pattern or dot pattern 114 scatters or refracts the incident light, to thereby improve a light emission efficiency.

The first optical pattern part 113 is prepared in a predetermined portion of the first light-emission portion 100a adjacent to the second light-emission portion 100b. That is, the first light-emission portion 100a may include a flat area (FA) having a first size, which is adjacent to the first light-incidence surface 111a, and a pattern area (PA) having a second size, which is adjacent to the second light-emission portion 100b. In this case, with respect to the first direction (X), a length of the flat area (FA) may be larger than a length of the pattern area (PA). According as the first optical pattern part 113 according to one embodiment of the present invention is prepared in the pattern area (PA) of the first light-emission portion 100a, it is possible to control the path of light which is incident on the first light guiding portion 110a through the first light-incidence surface 111a, and is advanced toward the second light guiding portion 110b, to thereby prevent or minimize the light advancing from the first light guiding portion 110a toward the second light guiding portion 110b.

The first optical pattern part 113 according to one embodiment of the present invention may include a plurality of first optical patterns (OP1) which are parallel to the first light-incidence surface 111a (or the long side of the second light guiding portion).

The plurality of first optical patterns (OP1) extend along a second direction (Y) which is parallel to a length direction of the first short side of the first light guiding portion 110a (or the long side of the second light guiding portion), and protrude out from a predetermined area of the first light-emission portion 100a adjacent to the second light-emission portion 100b so as to have a lens-shaped cross section. The plurality of first optical patterns (OP1) according to one embodiment of the present invention may be a prism pattern or lenticular pattern. Each of the plurality of first optical patterns (OP1), which extends in a direction perpendicular to the advancing direction of the light being incident on the first light-incidence surface 111a, is prepared in shape of lens, whereby the straightness of the light advancing toward the second light guiding portion 110b is reduced by the light which is incident on the predetermined area of the first light-emission portion 100a. That is, some of the light which is incident on the predetermined area of the first light-emission portion 100a is refracted (or collected) by the first optical pattern (OP1) and is then provided to the first light-emission portion 100a, and the remaining of the incident light is totally reflected on the inside of the first light guiding portion 110a overlapped with the first optical pattern (OP1), repetitively, by the first optical pattern (OP1), and is straightened, and then scattered and refracted by the engrave pattern 114, is refracted by the first optical pattern (OP1) and is then provided to the first light-emission portion 100a. Accordingly, each of the plurality of first optical patterns (OP1) reduce the straightness of the light which is incident on the predetermined area of the first light-emission portion 100a and is advancing toward the second light guiding portion 110b, thereby improving uniformity of the luminance properties of the light emission in the first light-emission portion 100a, and preventing a light leakage between the first light guiding portion 110a and the second light guiding portion 110b.

A size in each of the plurality of first optical patterns (OP1) is gradually increased as each first optical pattern (OP1) becomes close to the second light-emission portion 100b. That is, a width (W1 to Wn) and height (H1 to Hn) in each of the plurality of first optical patterns (OP1) may be gradually increased as each first optical pattern (OP1) becomes close to the second light-emission portion 100b. In other words, among the plurality of first optical patterns (OP1), the first one (OP1) which is adjacent to the first light-incidence surface 111a has the relatively-small first width (W1) and first height (H1), and the last one (OP1) which is adjacent to the second light-emission portion 100b has the relatively-large 'n' width (Wn) and 'n' height (Hn). According as the light which is incident on each of the plurality of first optical patterns (OP1) becomes close to the second light-emission portion 100b, its light emission efficiency becomes lowered. Thus, it is possible to improve uniformity of the luminance properties of the light emission in the first light-emission portion 100a and to prevent a dark point occurring in an upper end of the first light guiding portion 110a adjacent to the second light guiding portion 110b by reducing the amount of light reaching the second light guiding portion 110b from the first light guiding portion 110a.

Meanwhile, if each of the plurality of first optical patterns (OP1) has the largest width of the 'n' width (Wn) and the relatively-largest height of the 'n' height (Hn), the light which is incident on the first light-incidence surface 111a does not reach the end of the first light guiding portion 110a, whereby it is difficult to realize uniformity of the luminance properties of the light emission in the first light-emission portion 100a. On the contrary, if each of the plurality of first optical patterns (OP1) has the smallest width of the first width (W1) and the smallest height of the first height (H1), the light which is incident on the first light-incidence surface 111a advances toward the second light guiding portion 110b via the end of the first light guiding portion 110a, and the light advances toward the first light guiding portion 110a from the second light guiding portion 110b, whereby there is the light leakage between the first light guiding portion 110a and the second light guiding portion 110b. In order to overcome these problems, the plurality of first optical patterns (OP1) according to the embodiment of the present invention may have the different sizes so that it is possible to realize uniformity of the luminance properties of the light emission in the first light-emission portion 100a and also to prevent or minimize the light leakage between the first light guiding portion 110a and the second light guiding portion 110b.

The second optical pattern part 115 is prepared in the second light-emission portion 100b. The second optical pattern part 115 controls the path of light which is incident to the inside of the second light guiding portion 110b through the second light-incidence surface 111b, thereby improving straightness of the light which is incident to the inside of the second light guiding portion 110b and improving the luminance properties of the light emission in the second light-emission portion 100b.

The second optical pattern part 115 according to one embodiment of the present invention may include at least one second optical pattern (OP2) prepared to be parallel to the first optical pattern (OP1).

At least one second optical pattern (OP2) extends along the second direction (Y), and protrudes out from the second light-emission portion 100b so as to have a lens-shaped cross section. At least one second optical pattern (OP2) according to one embodiment of the present invention may be a prism pattern or lenticular pattern. If the second optical pattern part 115 includes the plurality of second optical patterns (OP2), the plurality of second optical patterns (OP2) may have the same width and height.

At least one second optical pattern (OP2) collects the light which is incident on the second light guiding portion 110b, provides the collected light to the second light-emission portion 100b, and totally reflects the light incident at an angle which is out of a rang of a total-reflection critical angle, to thereby improve straightness of the light. That is, some of the light which is incident on the second light guiding portion 110b is refracted (or collected) by the second optical pattern (OP2) and is then provided to the second light-emission portion 100b, and the remaining of the incident light is totally reflected on the inside of the second light guiding portion 110b, repetitively, by the second optical pattern (OP2), and is straightened, and then scattered and refracted by the engrave pattern 114, is refracted by the second optical pattern (OP2) and is then provided to the second light-emission portion 100b. Thus, at least one second optical pattern (OP2) improves straightness of the light which is incident on the second light guiding portion 110b, and improves the luminance properties of the light emission in the second light-emission portion 100b, to thereby improve uniformity of the luminance properties of the light emission in the second light-emission portion 100b. Specifically, at least one second optical pattern (OP2) collects some of the incident light, and provides the collected light to the second light-emission portion 100b, to thereby prevent or minimize the leakage of light which is incident on the second light guiding portion 110b and is advancing toward the first light guiding portion 110a.

The light source 130 individually provides the light to the first light-incidence surface 111a and the second light-incidence surface 111b prepared in the light guiding plate 110, whereby the liquid crystal display panel 300 is irradiated with the light through the use of at least one of the first light-emission portion 100a and the second light-emission portion 100b prepared in the light guiding plate 110. The light source 130 according to one embodiment of the present invention may include a first light source module 131 and a second light source module 133.

The first light source module 131 may include a plurality of first light emitting diode devices (LED1) for emitting the light to the first light-incidence surface 111a, wherein the plurality of first light emitting diode devices (LED1) are mounted on a first light source printed circuit board (PCB1). The plurality of first light emitting diode devices (LED1) are mounted at fixed intervals along the second direction (Y) on the first light source printed circuit board (PCB1) while being confronted with the first light-incidence surface 111a. In this case, the interval (or pitch) between each of the adjacent first light emitting diode devices (LED1) may be designed within a range capable of preventing a hot spot in the area of the first light-incidence surface 111a.

The plurality of first light emitting diode devices (LED1) may be grouped into a plurality of light source groups. Each group may include at least one first light emitting diode devices (LED1) being adjacent in the second direction (Y), wherein the number of the first light emitting diode devices (LED1) included in each of the light source groups may be the same or different from each other. The plurality of light source groups may be individually driven by a local dimming driving method.

The second light source module 133 may include at least one second light emitting diode devices (LED2) for emitting the light to the second light-incidence surface 111b, wherein the at least one second light emitting diode devices (LED2) are mounted on a second light source printed circuit board (PCB2). The at least one second light emitting diode devices (LED2) is mounted at fixed intervals along the first direction (X) on the second light source printed circuit board (PCB2) while being confronted with the second light-incidence surface 111b. In this case, the interval (or pitch) between each of the adjacent second light emitting diode devices (LED2) may be designed within a range capable of preventing a hot spot in the area of the second light-incidence surface 111b.

Selectively, a luminous intensity of the first light emitting diode device (LED1) may be different from a luminous intensity of the second light emitting diode device (LED2). That is, the first light source module 131 emits the light to the first light guiding portion 110a with a relatively-large size, and the second light source module 133 emits the light to the second light guiding portion 110b with a relatively-small size. Preferably, the luminous intensity of the second light emitting diode device (LED2) is smaller than the luminous intensity of the first light emitting diode device (LED1).

The light source 130 individually drives the first light source module 131 and the second light source module 133 so that the liquid crystal display panel 300 is entirely or partially irradiated with the light by the use of at least one of the first light-emission portion 100a and the second light-emission portion 100b prepared in the light guiding plate 110, which enables a local dimming driving method of the liquid crystal display panel 300.

The reflective sheet 150 is disposed on a lower surface of the light guiding plate 110, and the reflective sheet 150 reflects the light, which is guided by the light guiding plate 110, toward the light guiding plate 110, to thereby minimize a loss of the light. A shape of the reflective sheet 150 is the same as a shape of the light guiding plate 110. For example, the reflective sheet 150 may include a first reflective portion 151 overlapped with the first light guiding portion 110a, and a second reflective portion 153 overlapped with the second light guiding portion 110b.

The optical sheet portion 170 is disposed on the light guiding plate 110, wherein the optical sheet portion 170 may include a lower diffusion sheet, a lower prism sheet, and an upper prism sheet, but not limited to this structure. For example, the optical sheet portion 170 may be formed in a deposition structure obtained by selecting at least two among a diffusion sheet, a prism sheet, a dual brightness enhancement film, and a lenticular sheet. Each optical sheet of the optical sheet portion 170 may have the same shape as the light guiding plate 110. For example, each optical sheet of the optical sheet portion 170 may include a first sheet 171 overlapped with the first light guiding portion 110a, and a second sheet 173 overlapped with the second light guiding portion 110b.

The liquid crystal display panel 300 may include confronting first and second substrates 310 and 330 bonded to each other with a liquid crystal layer interposed in-between. The liquid crystal display panel 300 displays at least one of main image and sub image by the use of light emitted from the backlight unit 100.

The first substrate 310 corresponding to a thin film transistor array substrate may be formed of a glass or plastic material. The first substrate 310 according to one embodiment of the present invention may include a non-display area (NDA), a first display area (DA1), and a second display area (DA2).

The non-display area (NDA) is prepared in the periphery of the first substrate 310. In this case, the non-display area (NDA) prepared at a first side of the first substrate 310 is relatively larger than another non-display area (NDA).

The first display area (DA1) is overlapped with the first light-emission portion 100a of the light guiding plate 110. The first display area (DA1) is relatively larger than the second display area (DA2), and the first display area (DA1) is surrounded by the non-display area (NDA). The first display area (DA1) may be defined as the main screen for displaying the main image.

The second display area (DA2) according to one embodiment of the present invention is overlapped with the second light-emission portion 100b of the light guiding plate 110. The second display area (DA2) is not physically separated but spatially separated from the first display area (DA1), and the second display area (DA2) whose size is relatively smaller than that of the first display area (DA1) is surrounded by the non-display area (NDA). The second display area (DA2) may be defined as the sub screen for displaying the sub image.

For example, the second display area (DA2) is prepared in a protruding portion which protrudes from a second side of the first substrate 310, wherein the second side of the first substrate 310 is parallel to the first side of the first substrate 310. In another example, the second display area (DA2) is prepared in a predetermined portion of the first display area (DA1) adjacent to a second side of the first substrate 310, wherein the second side of the first substrate 310 is opposite to the first side of the first substrate 310, and the second display area (DA2) is provided in a shape obtained by removing one side (or one corner) 300a of the first display area (DA1) adjacent to the second side of the first substrate 310.

The first display area (DA1) and the second display area (DA2) may include a plurality of pixels prepared every pixel region obtained by crossing a plurality of gate lines and a plurality of data lines. In this case, each of the plurality of data lines prepared in the first display area (DA1) extends to the second display area (DA2). Each of the plurality of pixels may include a thin film transistor connected with the gate and data lines, a pixel electrode connected with the thin film transistor, and a common electrode provided adjacent to the pixel electrode and supplied with a common voltage.

The first substrate 310 according to one embodiment of the present invention may further include an internal gate driving circuit prepared at a third side and/or a fourth side of the first substrate 310.

The internal gate driving circuit is provided in the non-display area of the third side and/or fourth side of the first substrate 310, and is formed while being connected with each gate line for a process of manufacturing the thin film transistor. The internal gate driving circuit generates a gate signal in accordance with a gate control signal, and supplies the generated gate signal to the corresponding gate line in accordance with a preset order.

The second substrate 330 may include a pixel defining pattern for defining an opening area overlapped with each pixel prepared in the first substrate 310, and a color filter provided in the opening area. Under the condition that the liquid crystal layer is interposed between the first substrate 310 and the second substrate 330 confronting each other, the second substrate 330 is bonded to the remaining area of the first substrate 310 except the non-display area (NDA) prepared at the first side of the first substrate 310 by the use of sealant. A shape of the second substrate 330 is the same as a shape of a bonding surface of the first substrate 310 to be bonded to the second substrate 330.

At least one of the first substrate 310 and the second substrate 330 may include an alignment film for setting a pretilt angle of liquid crystal. The liquid crystal layer is interposed between the first substrate 310 and the second substrate 330, wherein the liquid crystal layer includes liquid crystal molecules aligned by an in-plane electric field formed by the common voltage and data voltage applied to the pixel electrode for each pixel.

A lower polarizing member with a first polarizing axis is attached to a rear surface of the first substrate 310, and an upper polarizing member with a second polarizing axis which is perpendicular to the first polarizing axis is attached to a front surface of the second substrate 330.

In the liquid crystal display panel 300, the common electrode is used as a touch sensing electrode for a touch sensing mode, and the common electrode together with the pixel electrode is used as a liquid crystal driving electrode for a displaying mode. That is, the liquid crystal display panel 300 may be an in-cell touch liquid crystal display panel, and more particularly, a self capacitance in-cell touch liquid crystal display panel. For example, the in-cell touch liquid crystal display panel may be a liquid crystal display panel of an LCD device with a touch sensor disclosed in the Korean Patent Publication No. 10-2013-0015584, but not limited to this type.

The liquid crystal display panel 300 according to one embodiment of the present invention may further include a panel driving circuit 350.

The panel driving circuit 350 is mounted on a chip mounting area prepared at the first side of the first substrate 310. The panel driving circuit 350 is connected with a pad portion prepared at the first side of the first substrate 310, and is connected with each of the plurality of data lines and the internal gate driving circuit. The panel driving circuit 350 is connected with a system driving circuit through a flexible circuit film 370 attached to the pad portion. According as the panel driving circuit 350 drives each pixel of the liquid crystal display panel 300 under the control of the system driving circuit, the image is displayed on at least any one of the first display area (DA1) and the second display area (DA2) of the liquid crystal display panel 300.

For a normal driving mode, the panel driving circuit 350 displays the main image on the first display area (DA1) and displays the sub image on the second display area (DA2) in accordance with main image data, sub image data, and control signal supplied from the system driving circuit. For example, the panel driving circuit 350 displays a black image on the first display area (DA1) and displays the sub image on the second display area (DA2) in accordance with sub image data and control signal supplied from the system driving circuit for a sub screen local dimming driving mode.

The flexible circuit film 370 is connected with the pad portion prepared in the first substrate 310, and is connected with the system driving circuit. The flexible circuit film 370 relays an interface between the panel driving circuit 350 and the system driving circuit.

Selectively, the panel driving circuit 350 may be mounted on the flexible circuit film 370 instead of the chip mounting area of the first substrate 310. In this case, the chip mounting area is removed so that it is possible to reduce a width of the first side of the first substrate 310.

According as the liquid crystal display panel 300 is provided with the first display area (DA1) and the second display area (DA2) which are not physically separated but spatially separated from each other, it is possible to provide the sub screen corresponding to the second display area (DA2), whereby the sub image may be displayed only on the second display area (DA2) by a local dimming driving method.

Figure 5A:
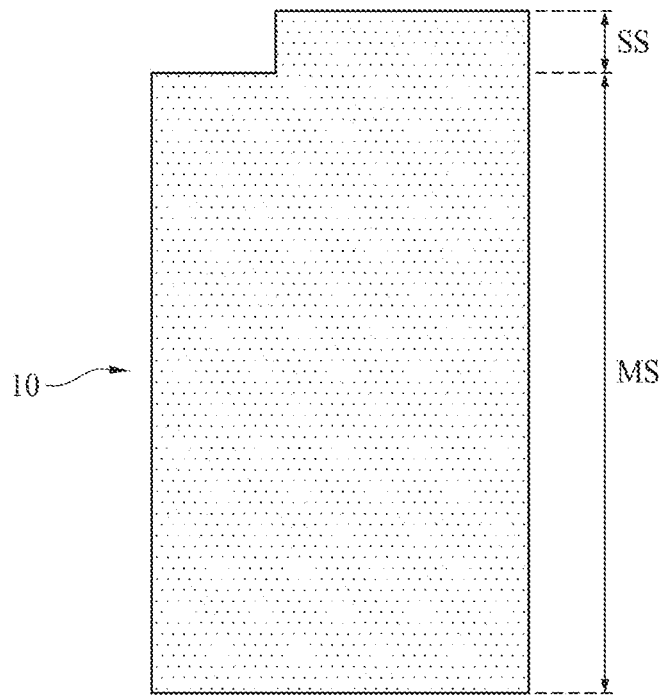
FIGS. 5A to 5C illustrate a luminance in each of main and sub screens for a driving mode of an LCD device according to the embodiment of the present invention.
Figure 5B:
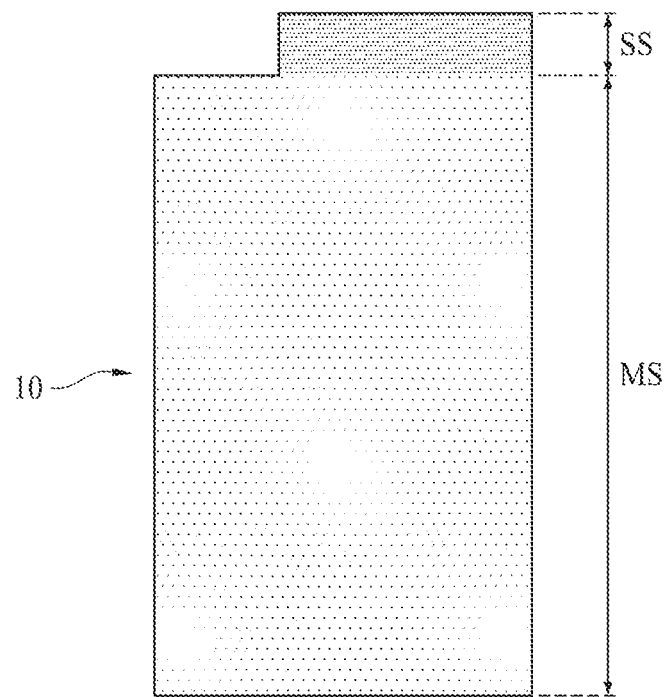
Figure 5C:
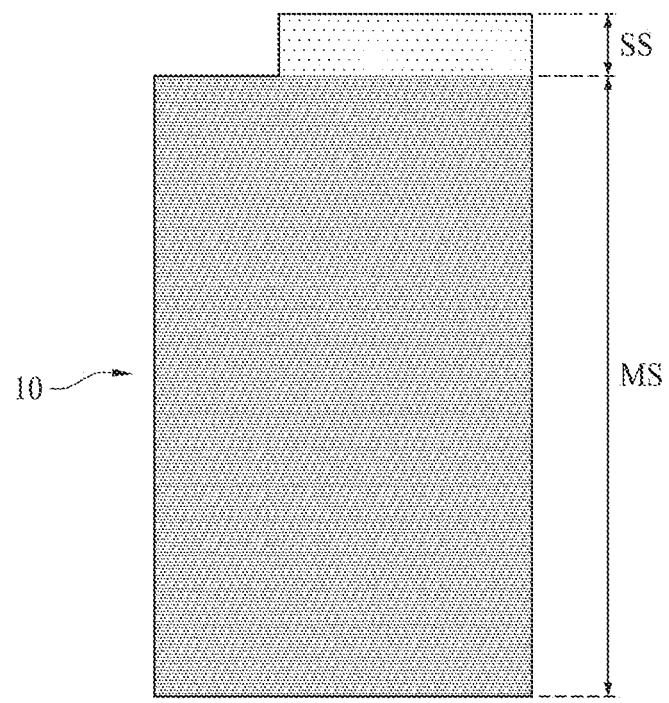

FIGS. 5A to 5C illustrate the luminance for each of the main screen and the sub screen for the driving mode of the LCD device, wherein FIG. 5A illustrates a luminance distribution in each of the main screen and the sub screen when both the main screen and the sub screen are driven, FIG. 5B illustrates a luminance distribution in each of the main screen and the sub screen when only the main screen is driven, and FIG. 5C illustrates a luminance distribution in each of the main screen and the sub screen when only the sub screen is driven.

As shown in FIG. 5A, when both the main screen (MS) and the sub screen (SS) of the LCD device according to the embodiment of the present invention are driven, it shows the uniform luminance distribution in each of the main screen (MS) and the sub screen (SS) in accordance with the driving of each of the first and second light source modules of the light source.

As shown in FIG. 5B, when only the main screen (MS) of the LCD device according to the embodiment of the present invention is driven, it shows the uniform luminance distribution of the main screen (MS) in accordance with the driving of the first light source module of the light source. Specifically, it is possible to prevent the dark point in the upper area of the main screen (MS) adjacent to the sub screen (SS). Accordingly, when only the main screen (MS) of the LCD device according to the embodiment of the present invention is driven, the dark point is not generated in the upper area of the main screen (MS), whereby it is possible to drive only the main screen (MS) by the driving of the first light source module of the light source, to thereby reduce power consumption for driving the main screen (MS).

As shown in FIG. 5C, when only the sub screen (SS) of the LCD device according to the embodiment of the present invention is driven, it shows the uniform luminance distribution of the sub screen (SS) in accordance with the driving of the second light source module of the light source. Also, it is possible to prevent or minimize the light leakage of the sub screen (SS), which occurs when the light of the sub screen (SS) advances toward the main screen (MS). Accordingly, when only the sub screen (SS) of the LCD device according to the embodiment of the present invention is driven, it is possible to drive only the sub screen (SS) by the driving of the second light source module of the light source, to thereby reduce power consumption for driving the sub screen (SS). Also, it is possible to prevent the light leakage of the sub screen (SS), to thereby improve the luminance of the sub screen (SS).

As described above, in case of the LCD device 10 according to the embodiment of the present invention, the liquid crystal display panel 300 may be divided into the main screen (MS) and the sub screen (SS), and the main screen (MS) and the sub screen (SS) may be individually driven through the individual light emissions of the first and second light-emission portions 100a and 100b so that it is possible to minimize power consumption for driving the sub screen (SS). Also, the LCD device 10 according to the embodiment of the present invention may include the plurality of first optical patterns (OP1) prepared in some area of the first light-emission portion 100a adjacent to the second light-emission portion 100b, and at least one second optical pattern (OP2) prepared in the second light-emission portion 100b so that it is possible to prevent the dark point in the upper area of the main screen (MS) when the main screen (MS) is driven, and to improve the luminance of the sub screen (SS) by preventing the light leakage in the main screen (MS) when the sub screen (SS) is driven.

Figure 6:
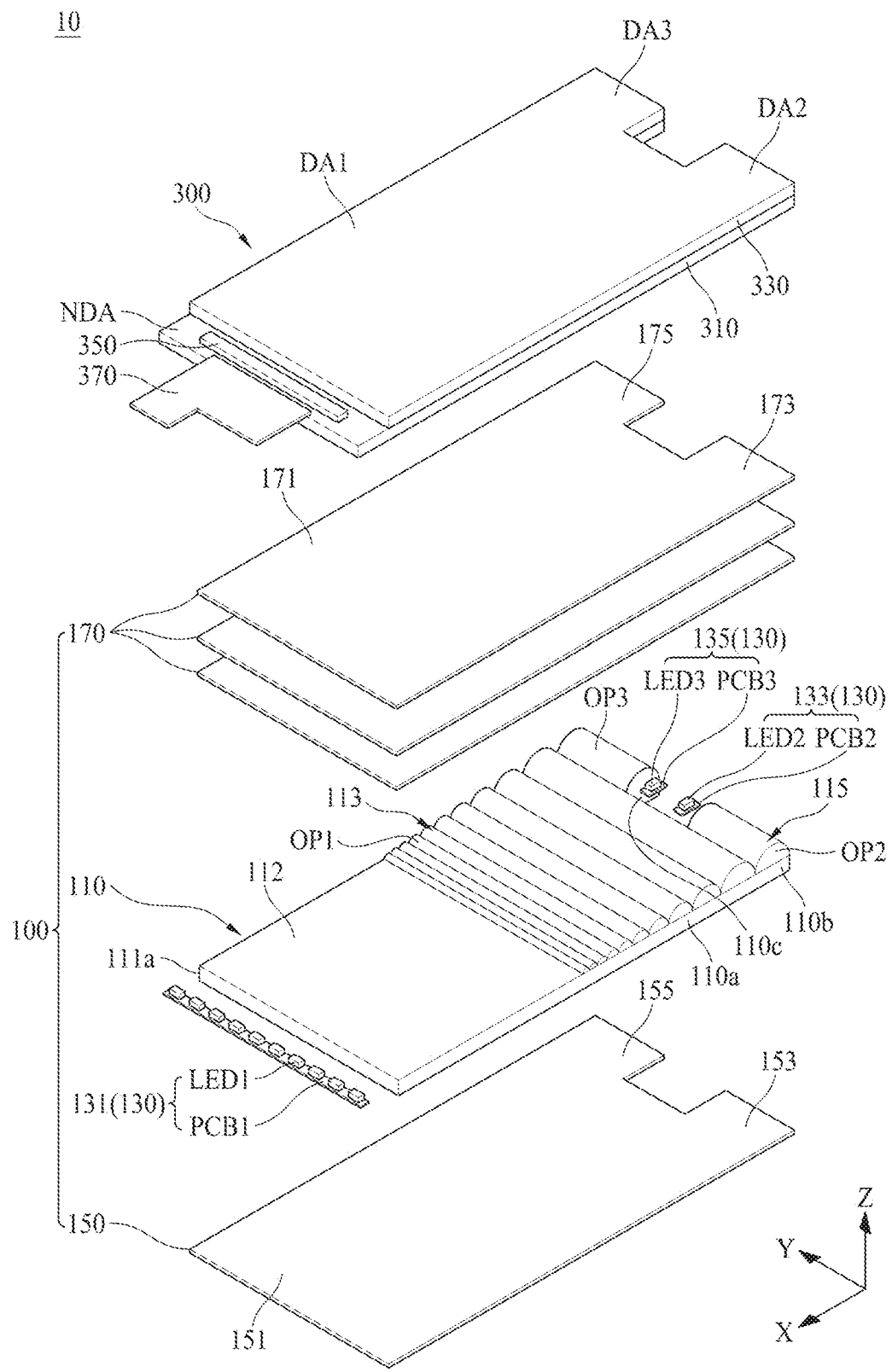
FIG. 6 is an exploded perspective view illustrating an LCD device according to another embodiment of the present invention.
Figure 7:
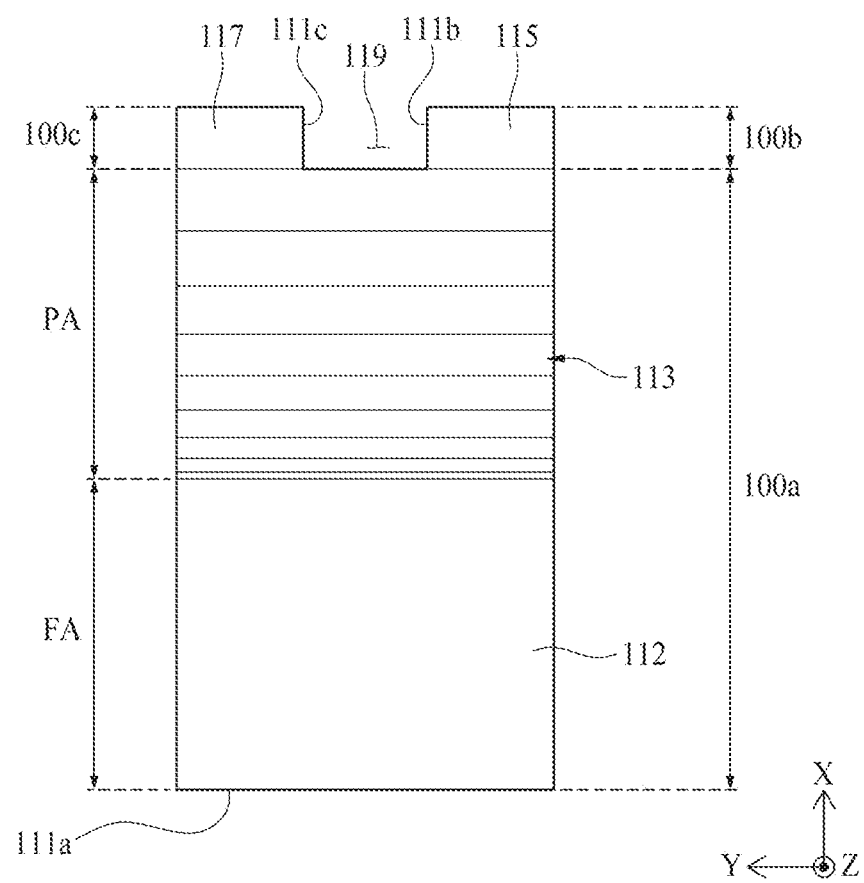
FIG. 7 is a plane view illustrating a light guiding plate of FIG. 6.

FIG. 6 is an exploded perspective view illustrating an LCD device according to another embodiment of the present invention, and FIG. 7 is a plane view illustrating a light guiding plate of FIG. 6.

Referring to FIGS. 6 and 7, the LCD device 10 according to another embodiment of the present invention may include a liquid crystal display module having a backlight unit 100 and a liquid crystal display panel 300.

The backlight unit 100 according to one embodiment of the present invention may include a light guiding plate 110, a light source 130, a reflective sheet 150, and an optical sheet portion 170.

The light guiding plate 110 according to one embodiment of the present invention may include a base member 111, a first optical pattern part 113, a second optical pattern part 115, and a third optical pattern part 117.

The base member 111 may include a first light-emission portion 100a, a second light-emission portion 100b which is adjacent to the first light-emission portion 100a, and a third light-emission portion 100c which is parallel to the second light-emission portion 100b. The first light-emission portion 100a is relatively larger than the second light-emission portion 100b and the third light-emission portion 100c. Each of the second light-emission portion 100b and the third light-emission portion 100c is not physically separated but spatially separated from the first light-emission portion 100a, and each of the second light-emission portion 100b and the third light-emission portion 100c is relatively smaller than the first light-emission portion 100a. The second light-emission portion 100b and the third light-emission portion 100c are parallel to each other.

The base member 111 according to one embodiment of the present invention may include a first light-incidence surface 111a prepared at one side of the first light-emission portion 100a, a second light-incidence surface 111b prepared at one side of the second light-emission portion 100b, and a third light-incidence surface 111c prepared at one side of the third light-emission portion 100c.

The base member 111 according to one embodiment of the present invention may include a first light guiding portion 110a, a second light guiding portion 110b, and a third light guiding portion 110c.

The first light guiding portion 110a includes the first light-emission portion 100a and the first light-incidence surface 111a, and the first light guiding portion 110a is identical in structure and shape to the first light guiding portion shown in FIGS. 2 to 4, whereby a detailed description for the first light guiding portion 110a will be omitted.

The second light guiding portion 110b protrudes from one side of the first light guiding portion 110a, wherein the second light guiding portion 110b includes the second light-incidence surface 111b and the second light-emission portion 100b. Except that a length of a long side of the second light guiding portion 110b which is parallel to the second direction (Y) is the half or less than half in comparison to a length of a first short side of the first light guiding portion 110a, the second light guiding portion 110b is identical in structure and shape to the second light guiding portion shown in FIGS. 2 to 4, whereby a detailed description for the second light guiding portion 110b will be omitted.

The third light guiding portion 110c protruding from one side of the first light guiding portion 110a is provided at a predetermined interval from the second light guiding portion 110b while being parallel to the second light guiding portion 110b, wherein the third light guiding portion 110c includes the third light-incidence surface 111c and the third light-emission portion 100c. Except that a length of a long side of the third light guiding portion 110c which is parallel to the second direction (Y) is the half or less than half in comparison to a length of a first short side of the first light guiding portion 110a, the third light guiding portion 110c is identical in structure and shape to the second light guiding portion shown in FIGS. 2 to 4, whereby a detailed description for the third light guiding portion 110c will be omitted.

Under the condition that a light source arrangement area 119 is disposed between the second light guiding portion 110b and the third light guiding portion 110c, the second light guiding portion 110b and the third light guiding portion 110c are parallel to each other, whereby the second light guiding portion 110b and the third light guiding portion 110c are symmetric to each other with respect to the center of the short side of the base member 111. The light source arrangement area 119 corresponds to a gap space between the second light guiding portion 110b and the third light guiding portion 110c, wherein some of the light source 130 is disposed in the light source arrangement area 119, and more particularly, a camera module to be loaded on an electronic device is disposed in the light source arrangement area 119.

The first optical pattern part 113 includes a plurality of first optical patterns (OP1) prepared in some area of the first light-emission portion 100a adjacent to the second light-emission portion 100b of the second light guiding portion 110b. The plurality of first optical patterns (OP1) reduce straightness of the light for some area of the first light-emission portion 100a, thereby improving uniformity of the luminance properties of the light emission in the first light-emission portion 100a, and preventing a light leakage in an upper area of the first light guiding portion 110a adjacent to the second light guiding portion 110b. The first optical pattern part 113 including the plurality of first optical patterns (OP1) is identical in structure to the first optical pattern part shown in FIGS. 2 to 4, whereby a detailed description for the first optical pattern part 113 will be omitted.

The second optical pattern part 115 includes at least one second optical pattern (OP2) prepared in the second light-emission portion 100b of the second light guiding portion 110b. The at least one second optical pattern (OP2) collects some of the incident light, provides the collected light to the second light-emission portion 100b, and prevents (or minimizes) the light which is incident on the second light guiding portion 110b from advancing toward and leaking in the first light guiding portion 110a. The second optical pattern part 115 including the second optical pattern (OP2) is identical in structure to the second optical pattern part shown in FIGS. 2 to 4, whereby a detailed description for the second optical pattern part 115 will be omitted.

The third optical pattern part 117 includes at least one third optical pattern (OP3) prepared in the third light-emission portion 100c of the third light guiding portion 110c. The at least one third optical pattern (OP3) collects some of the incident light, provides the collected light to the third light-emission portion 100c, and prevents (or minimizes) the light which is incident on the third light guiding portion 110c from advancing toward and leaking in the first light guiding portion 110a. Except that the third optical pattern part 117 including the third optical pattern (OP3) is prepared in the third light-emission portion 100c of the third light guiding portion 110c, the third optical pattern part 117 is identical in structure to the above second optical pattern part 115, whereby a detailed description for the third optical pattern part 117 will be omitted.

In case of the light source 130 according to one embodiment of the present invention, the first light-incidence surface 111a, the second light-incidence surface 111b, and the third light-incidence surface 111c, which are prepared in the light guiding plate 110, are individually irradiated with the light so that the liquid crystal display panel 300 is irradiated with the light through the use of at least one of the first light-emission portion 100a, the second light-emission portion 100b, and the third light-emission portion 100c prepared in the light guiding plate 110. The light source 130 according to one embodiment of the present invention may include a first light source module 131, a second light source module 133, and a third light source module 135.

The first light source module 131 may include a plurality of first light emitting diode devices (LED1) for emitting the light to the first light-incidence surface 111a, wherein the plurality of first light emitting diode devices (LED1) are mounted on a first light source printed circuit board (PCB1). The first light source module 131 is identical in structure to the first light source module shown in FIGS. 2 to 4, whereby a detailed description for the first light source module 131 will be omitted.

The second light source module 133 may include a plurality of second light emitting diode devices (LED2) for emitting the light to the second light-incidence surface 111b, wherein the plurality of second light emitting diode devices (LED2) are mounted on a second light source printed circuit board (PCB2). Except that the second light source module 133 is disposed at one side of the light source arrangement area 119 while being adjacent to the second light-incidence surface 111b, the second light source module 133 is identical in structure to the second light source module shown in FIGS. 2 to 4, whereby a detailed description for the second light source module 133 will be omitted.

The third light source module 135 may include a plurality of third light emitting diode devices (LED3) for emitting the light to the third light-incidence surface 111c, wherein the plurality of third light emitting diode devices (LED3) are mounted on a third light source printed circuit board (PCB3). Except that the third light source module 135 is disposed at the other side of the light source arrangement area 119 while being adjacent to the third light-incidence surface 111c, the third light source module 135 is identical in structure to the above second light source module, whereby a detailed description for the third light source module 135 will be omitted.

In case of the light source 130 according to one embodiment of the present invention, the first light source module 131, the second light source module 133, and the third light source module 135 are individually driven so that it is possible to totally or locally irradiate the liquid crystal display panel 300 with the light through the use of at least one of the first light-emission portion 100a, the second light-emission portion 100b, and the third light-emission portion 100c prepared in the light guiding plate 110, which enables the local dimming driving method of the liquid crystal display panel 300.

The reflective sheet 150 is disposed on a lower surface of the light guiding plate 110, and the reflective sheet 150 reflects the light, which is guided by the light guiding plate 110, toward the light guiding plate 110, to thereby minimize a loss of the light. A shape of the reflective sheet 150 is the same as a shape of the light guiding plate 110. For example, the reflective sheet 150 may include a first reflective portion 151 overlapped with the first light guiding portion 110a, a second reflective portion 153 overlapped with the second light guiding portion 110b, and a third reflective portion 155 overlapped with the third light guiding portion 110c.

The optical sheet portion 170 is disposed on the light guiding plate 110, wherein the optical sheet portion 170 may include a lower diffusion sheet, a lower prism sheet, and an upper prism sheet, but not limited to this structure. For example, the optical sheet portion 170 may be formed in a deposition structure obtained by selecting at least two among a diffusion sheet, a prism sheet, a dual brightness enhancement film, and a lenticular sheet. Each optical sheet of the optical sheet portion 170 may have the same shape as the light guiding plate 110. For example, each optical sheet of the optical sheet portion 170 may include a first sheet 171 overlapped with the first light guiding portion 110a, a second sheet 173 overlapped with the second light guiding portion 110b, and a third sheet 175 overlapped with the third light guiding portion 110c.

The liquid crystal display panel 300 may include confronting first and second substrates 310 and 330 bonded to each other with a liquid crystal layer interposed in-between. The liquid crystal display panel 300 may include a first display area (DA1) overlapped with the first light-emission portion 100a of the light guiding plate 110, a second display area (DA2) overlapped with the second light-emission portion 100b of the light guiding plate 110, and a third display area (DA3) overlapped with the third light-emission portion 100c of the light guiding plate 110. The first display area (DA1) may be defined as a main screen for displaying a main image, the second display area (DA2) may be defined as a first sub screen for displaying a first sub image, and the third display area (DA3) may be defined as a second sub screen for displaying a second sub image. The second display area (DA2) and the third display area (DA3) may be parallel to each other under the condition that a camera arrangement area 300b overlapped with the light source arrangement area 119 of the light guiding plate 110 is interposed between the second display area (DA2) and the third display area (DA3). In case of the liquid crystal display panel 300, the third display area (DA3) overlapped with the third light-emission portion 100c of the light guiding plate 110 is additionally provided, and the second display area (DA2) overlapped with the second light-emission portion 100b of the light guiding plate 110 is changed in its structure. Except for these parts, the liquid crystal display panel 300 is identical in structure to the liquid crystal display panel shown in FIGS. 2 to 4, whereby a detailed description for the liquid crystal display panel 300 will be omitted.

Figure 8A:
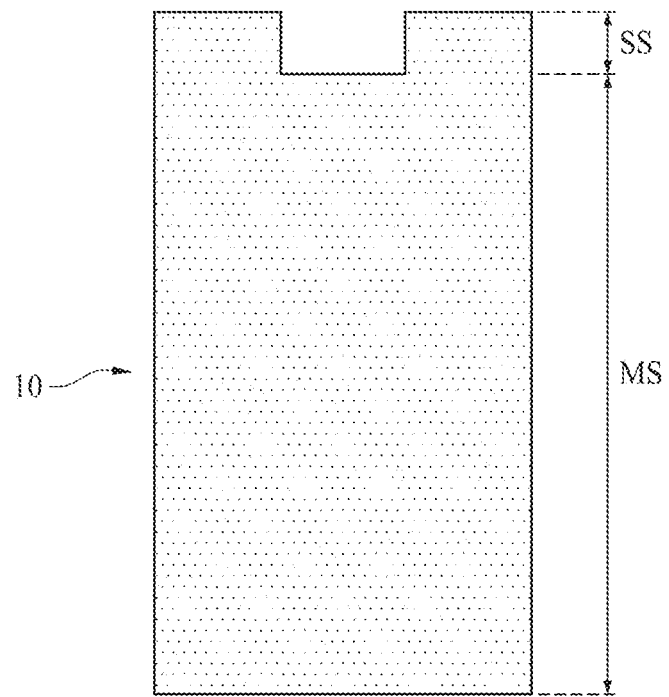
FIGS. 8A to 8C illustrate a luminance in each of a main screen, a first sub screen, and a second sub screen for a driving mode of an LCD device according to the embodiment of the present invention.
Figure 8B:
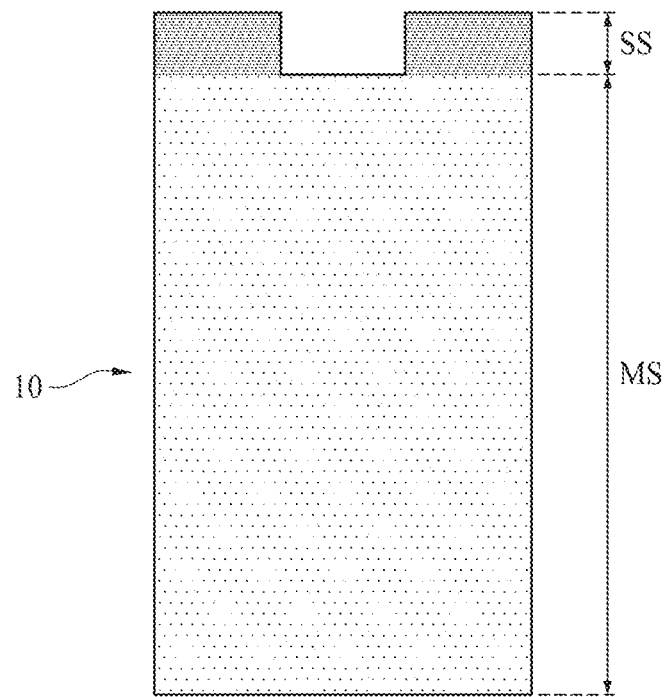
Figure 8C:
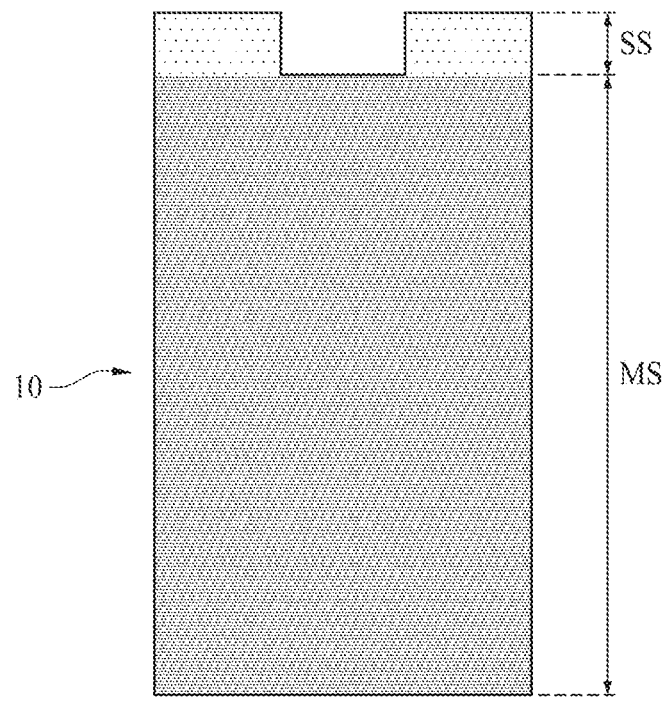

FIGS. 8A to 8C illustrate the luminance for each of the main screen, and the first and second sub screens for the driving mode of the LCD device, wherein FIG. 8A illustrates a luminance distribution in each of the main screen, and the first and second sub screens when the main screen, and the first and second sub screens are driven, FIG. 8B illustrates a luminance distribution in each of the main screen, and the first and second sub screens when only the main screen is driven, and FIG. 8C illustrates a luminance distribution in each of the main screen, and the first and second sub screens when only the first and second sub screens are driven.

As shown in FIG. 8A, when the main screen (MS), and the first and second sub screens (SS1, SS2) of the LCD device according to the embodiment of the present invention are driven, it shows the uniform luminance distribution in each of the main screen (MS), and the first and second sub screens (SS1, SS2) in accordance with the driving of each of the first, second, and third light source modules of the light source.

As shown in FIG. 8B, when only the main screen (MS) of the LCD device according to the embodiment of the present invention is driven, it shows the uniform luminance distribution of the main screen (MS) in accordance with the driving of the first light source module of the light source. Specifically, it is possible to prevent the dark point in the upper area of the main screen (MS) adjacent to the first and second sub screens (SS1, SS2). Accordingly, when only the main screen (MS) of the LCD device according to the embodiment of the present invention is driven, the dark point is not generated in the upper area of the main screen (MS), whereby it is possible to drive only the main screen (MS) by the driving of the first light source module of the light source, to thereby reduce power consumption for driving the main screen (MS).

As shown in FIG. 8C, when only the first and second sub screens (SS1, SS2) of the LCD device according to the embodiment of the present invention are driven, it shows the uniform luminance distribution in each of the first and second sub screens (SS1, SS2) in accordance with the driving of the second and third light source modules of the light source. Also, it is possible to prevent or minimize the light leakage in the first and second sub screens (SS1, SS2), which occurs when the light of the first and second sub screens (SS1, SS2) advances toward the main screen (MS). Accordingly, when only the first and second sub screens (SS1, SS2) of the LCD device according to the embodiment of the present invention are driven, it is possible to drive only the first and second sub screens (SS1, SS2) by the driving of the second light source module of the light source, to thereby reduce power consumption for driving the first and second sub screens (SS1, SS2). Also, it is possible to prevent the light leakage in the first and second sub screens (SS1, SS2), to thereby improve the luminance of each of the first and second sub screens (SS1, SS2).

As described above, in case of the LCD device 10 according to the embodiment of the present invention, the liquid crystal display panel 300 may be divided into the main screen (MS), and the first and second sub screens (SS1, SS2), and the main screen (MS), and the first and second sub screens (SS1, SS2) may be individually driven through the individual light emissions of the first to third light-emission portions 100a, 100b, and 100c of the light guiding plate 110 so that it is possible to minimize power consumption for driving the first and second sub screens (SS1, SS2). Also, the LCD device 10 according to the embodiment of the present invention may include the plurality of first optical patterns (OP1) prepared in some area of the first light-emission portion 100a adjacent to the second light-emission portion 100b, at least one second optical pattern (OP2) prepared in the second light-emission portion 100b, and at least one third optical pattern (OP3) prepared in the third light-emission portion 100c so that it is possible to prevent the dark point in the upper area of the main screen (MS) for driving the main screen (MS), and to improve the luminance of the first and second sub screens (SS1, SS2) by preventing the light leakage in the main screen (MS) for driving the first and second sub screens (SS1, SS2).

Figure 9:
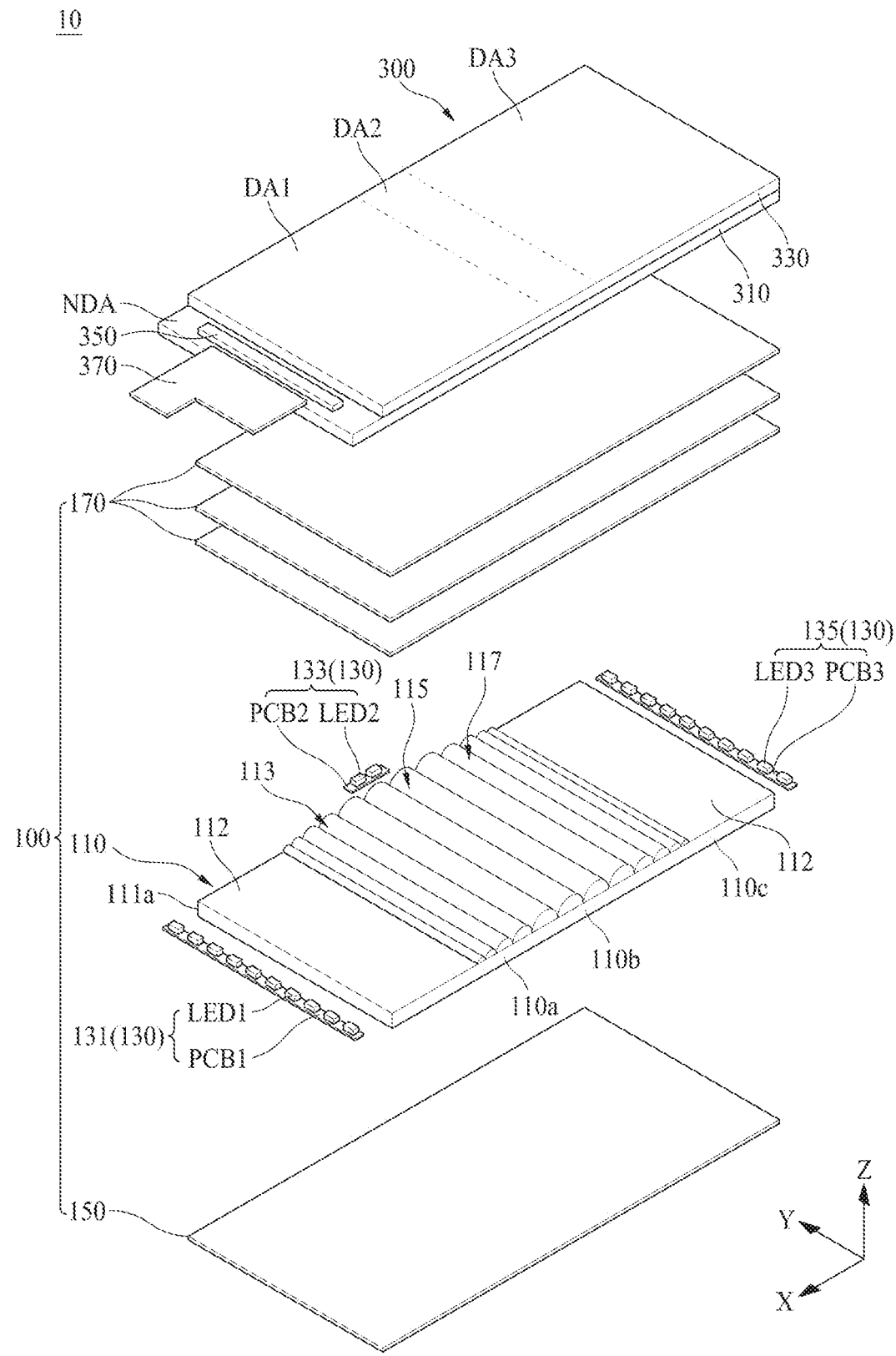
FIG. 9 is an exploded perspective view illustrating an LCD device according to another embodiment of the present invention.
Figure 10:
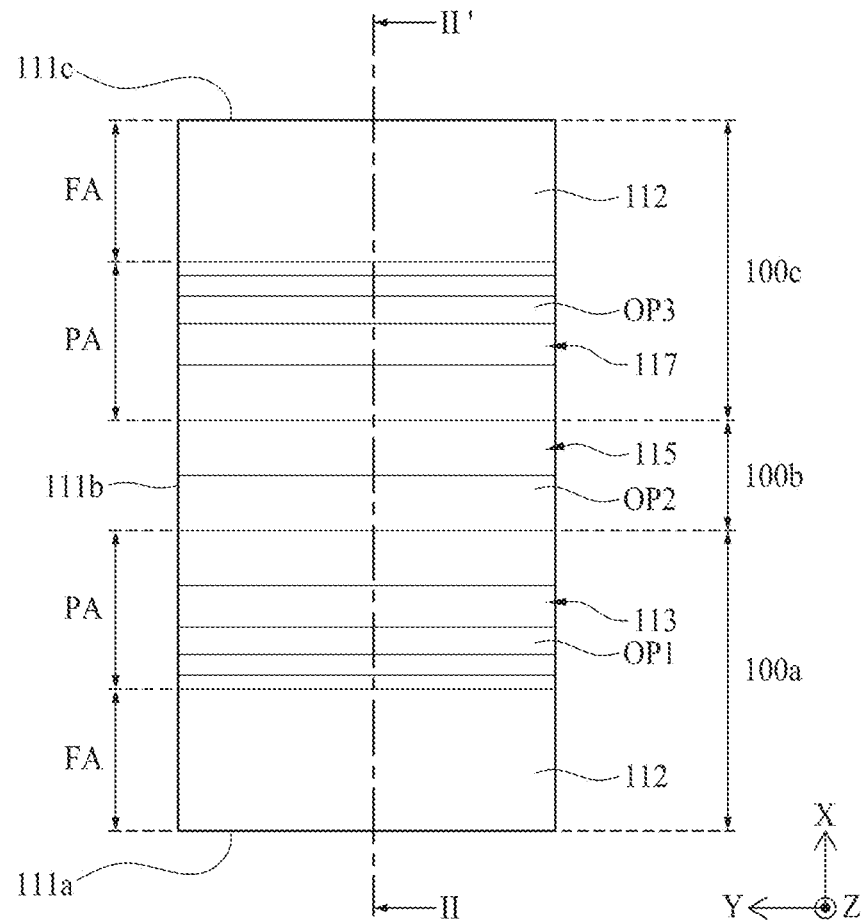
FIG. 10 is a plane view illustrating a light guiding plate of FIG. 9.
Figure 11:
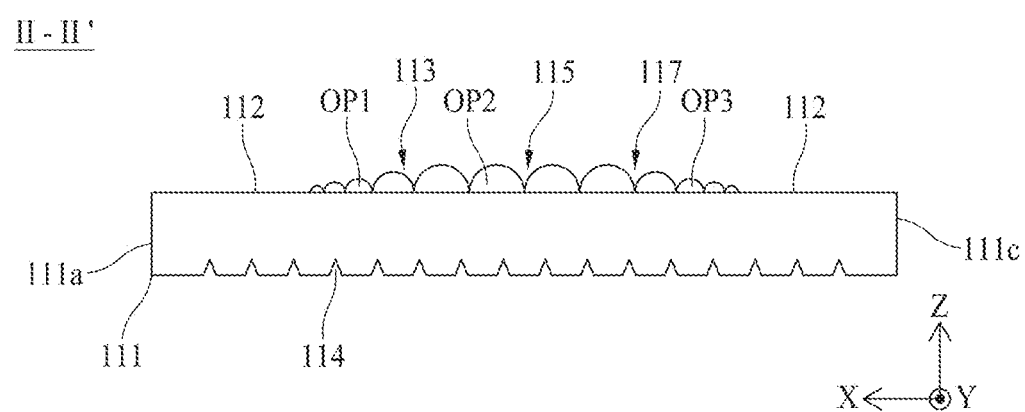
FIG. 11 is a cross sectional view along II-II' of FIG. 9.

FIG. 9 is an exploded perspective view illustrating an LCD device according to another embodiment of the present invention, FIG. 10 is a plane view illustrating a light guiding plate of FIG. 9, and FIG. 11 is a cross sectional view along II-II' of FIG. 9.

Referring to FIGS. 9 to 11, the LCD device 10 according to another embodiment of the present invention may include a liquid crystal display module having a backlight unit 100 and a liquid crystal display panel 300.

The backlight unit 100 according to one embodiment of the present invention may include a light guiding plate 110, a light source 130, a reflective sheet 150, and an optical sheet portion 170.

The light guiding plate 110 according to one embodiment of the present invention may include a base member 111, a first optical pattern part 113, a second optical pattern part 115, and a third optical pattern part 117.

The base member 111 may include a first light-emission portion 100a, a second light-emission portion 100b which is adjacent to the first light-emission portion 100a, and a third light-emission portion 100c which is adjacent to the second light-emission portion 100b. The first light-emission portion 100a and the third light-emission portion 100c are relatively larger than the second light-emission portion 100b, wherein the first light-emission portion 100a and the third light-emission portion 100c may have the same size or different sizes. The second light-emission portion 100b is disposed between the first light-emission portion 100a and the third light-emission portion 100c, wherein the second light-emission portion 100b is not physically separated but spatially separated from the first light-emission portion 100a and the third light-emission portion 100c, and the second light-emission portion 100b is relatively smaller than each of the first light-emission portion 100a and the third light-emission portion 100c.

The base member 111 according to one embodiment of the present invention may include a first light-incidence surface 111a prepared at one side of the first light-emission portion 100a, a second light-incidence surface 111b prepared at one side of the second light-emission portion 100b, and a third light-incidence surface 111c prepared at one side of the third light-emission portion 100c.

The base member 111 according to one embodiment of the present invention may include a first light guiding portion 110a, a second light guiding portion 110b, and a third light guiding portion 110c.

First, the base member 111 may be formed in a rectangular parallelepiped having first and second long sides with constant thickness and length, first and second short sides with constant thickness and length, and lower and upper surfaces with constant size. The first light guiding portion 110a, the second light guiding portion 110b, and the third light guiding portion 110c are not physically separated but spatially separated from each other in the base member 111.

The first light guiding portion 110a may include the first light-emission portion 100a and the first light-incidence surface 111a. The first light guiding portion 110a is identical in structure to the first light guiding portion shown in FIGS. 2 to 4, whereby a detailed description for the first light guiding portion 110a will be omitted.

The second light guiding portion 110b protrudes from one side of the first light guiding portion 110a, wherein the second light guiding portion 110b includes the second light-incidence surface 111b and the second light-emission portion 100b. In this case, a length of a long side of the second light guiding portion 110b, which is parallel to the second direction (Y), is the same as a length of a first short side of the first light guiding portion 110a. That is, the second light guiding portion 110b extends from one entire side of the first light guiding portion 110a in the first direction (X).

The third light guiding portion 110c protrudes from one side of the second light guiding portion 110b, wherein the third light guiding portion 110c includes the third light-incidence surface 111c and the third light-emission portion 100c. In this case, a length of a long side of the third light guiding portion 110c, which is parallel to the second direction (Y), is the same as a length of a first short side of the first light guiding portion 110a. That is, the third light guiding portion 110c extends from one entire side of the second light guiding portion 110b in the first direction (X).

Selectively, the first to third light guiding portions 110a, 110b, and 110c may have the same size or different sizes, whereby the first to third light-emission portions 100a, 100b, and 100c may have the same size or different sizes.

The first optical pattern part 113 may include a plurality of first optical patterns (OP1) prepared in some area of the first light-emission portion 100a adjacent to the second light-emission portion 100b of the second light guiding portion 110b. The plurality of first optical patterns (OP1) reduce straightness of the light for some area of the first light-emission portion 100a, thereby improving uniformity of the luminance properties of the light emission in the first light-emission portion 100a, and preventing a dark point in an upper area of the first light guiding portion 110a adjacent to the second light guiding portion 110b. The first optical pattern part 113 including the plurality of first optical patterns (OP1) is identical in structure to the first optical pattern part shown in FIGS. 2 to 4, whereby a detailed description for the first optical pattern part 113 will be omitted.

The second optical pattern part 115 includes at least one second optical pattern (OP2) prepared in the second light-emission portion 100b of the second light guiding portion 110b. The at least one second optical pattern (OP2) collects some of the incident light, provides the collected light to the second light-emission portion 100b, and prevents (or minimizes) the light which is incident on the second light guiding portion 110b from advancing toward and leaking in the first light guiding portion 110a and the third light guiding portion 110c. The second optical pattern part 115 including the second optical pattern (OP2) is identical in structure to the second optical pattern part shown in FIGS. 2 to 4, whereby a detailed description for the second optical pattern part 115 will be omitted.

The third optical pattern part 117 includes a plurality of third optical patterns (OP3) prepared in some area of the third light-emission portion 100c adjacent to the other side of the second light-emission portion 100b. The plurality of third optical patterns (OP3) reduce straightness of the light for some area of the third light-emission portion 100c, thereby improving uniformity of the luminance properties of the light emission in the third light-emission portion 100c, and preventing a dark point in a lower area of the third light guiding portion 110c adjacent to the second light guiding portion 110b. Except that the third optical pattern part 117 including the plurality of third optical patterns (OP3) is symmetric to the first optical pattern part 113 with respect to the center of the second optical pattern part 115, the third optical pattern part 117 is identical in structure to the first optical pattern part 113, whereby a detailed description for the third optical pattern part 117 will be omitted.

In case of the light source 130 according to one embodiment of the present invention, the first light source module 131, the second light source module 133, and the third light source module 135 are individually driven so that the liquid crystal display panel 300 is irradiated with the light through the use of at least one of the first light-emission portion 100a, the second light-emission portion 100b, and the third light-emission portion 100c prepared in the light guiding plate 110. The light source 130 according to one embodiment of the present invention may include a first light source module 131, a second light source module 133, and a third light source module 135.

The first light source module 131 may include a plurality of first light emitting diode devices (LED1) for emitting the light to the first light-incidence surface 111a, wherein the plurality of first light emitting diode devices (LED1) are mounted on a first light source printed circuit board (PCB1). The first light source module 131 is identical in structure to the first light source module shown in FIGS. 2 to 4, whereby a detailed description for the first light source module 131 will be omitted.

The second light source module 133 may include a plurality of second light emitting diode devices (LED2) for emitting the light to the second light-incidence surface 111b, wherein the plurality of second light emitting diode devices (LED2) are mounted on a second light source printed circuit board (PCB2). Except that the second light source module 133 is disposed adjacent to the second light-incidence surface 111b of the second light guiding portion 110b prepared in a first long side of the base member 111, the second light source module 133 is identical in structure to the second light source module shown in FIGS. 2 to 4, whereby a detailed description for the second light source module 133 will be omitted.

The third light source module 135 may include a plurality of third light emitting diode devices (LED3) for emitting the light to the third light-incidence surface 111c, wherein the plurality of third light emitting diode devices (LED3) are mounted on a third light source printed circuit board (PCB3). Except that the third light source module 135 is disposed adjacent to the third light-incidence surface 111c of the third light guiding portion 110c prepared in a second short side of the base member 111 which is parallel to the first light-incidence surface 111a, the third light source module 135 is identical in structure to the first light source module, whereby a detailed description for the third light source module 135 will be omitted.

In case of the light source 130 according to one embodiment of the present invention, the first light source module 131, the second light source module 133, and the third light source module 135 are individually driven so that it is possible to totally or locally irradiate the liquid crystal display panel 300 with the light through the use of at least one of the first light-emission portion 100a, the second light-emission portion 100b, and the third light-emission portion 100c prepared in the light guiding plate 110, which enables the local dimming driving mode of the liquid crystal display panel 300.

The reflective sheet 150 is disposed on a lower surface of the light guiding plate 110, and the reflective sheet 150 reflects the light, which is guided by the light guiding plate 110, toward the light guiding plate 110, to thereby minimize a loss of the light. A shape of the reflective sheet 150 is the same as a shape of the light guiding plate 110.

The optical sheet portion 170 is disposed on the light guiding plate 110, wherein the optical sheet portion 170 may include a lower diffusion sheet, a lower prism sheet, and an upper prism sheet, but not limited to this structure. For example, the optical sheet portion 170 may be formed in a deposition structure obtained by selecting at least two among a diffusion sheet, a prism sheet, a dual brightness enhancement film, and a lenticular sheet. Each optical sheet of the optical sheet portion 170 may have the same shape as the light guiding plate 110.

The liquid crystal display panel 300 may include confronting first and second substrates 310 and 330 bonded to each other with a liquid crystal layer interposed in-between. The liquid crystal display panel 300 may include a first display area (DA1) overlapped with the first light-emission portion 100a of the light guiding plate 110, a second display area (DA2) overlapped with the second light-emission portion 100b of the light guiding plate 110, and a third display area (DA3) overlapped with the third light-emission portion 100c of the light guiding plate 110. Except that the liquid crystal display panel 300 has a rectangular plane shape, the second display area (DA2) is disposed between the first display area (DA1) and the third display area (DA3), and some area of the second display area (DA2) is not removed, the liquid crystal display panel 300 is identical in structure to the liquid crystal display panel shown in FIGS. 2 to 4, whereby a detailed description for the liquid crystal display panel 300 will be omitted. For example, any one of the first to third display areas (DA1, DA2, DA3) is used as a sub screen, and the remaining two are used as main screens. Hereinafter, the first display area (DA1) is used as a first main screen for displaying a first main image, the third display area (DA3) is used as a second main screen for displaying a second main image, and the second display area (DA2) disposed between the first display area (DA1) and the third display area (DA3) is used as a sub screen.

Figure 12A:
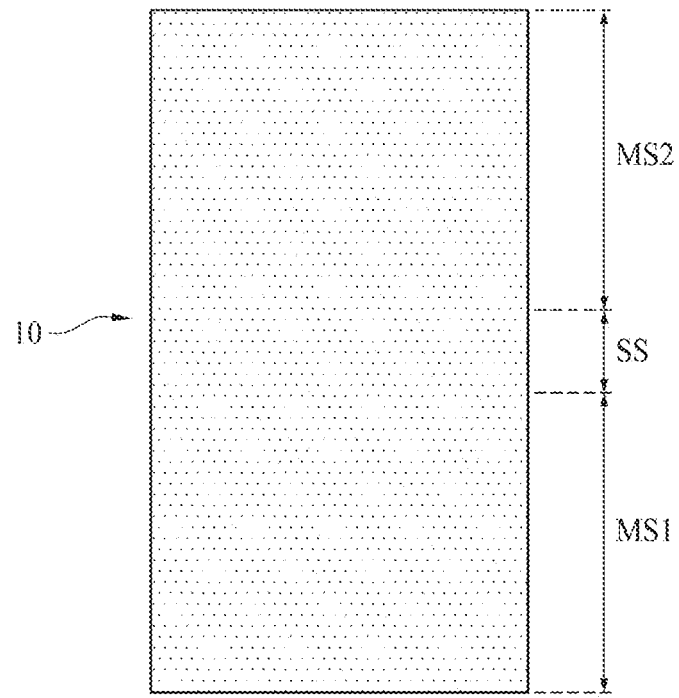
FIGS. 12A to 12D illustrate a luminance in each of a first main screen, a second main screen, and a sub screen for a driving mode of an LCD device according to the embodiment of the present invention.
Figure 12B:
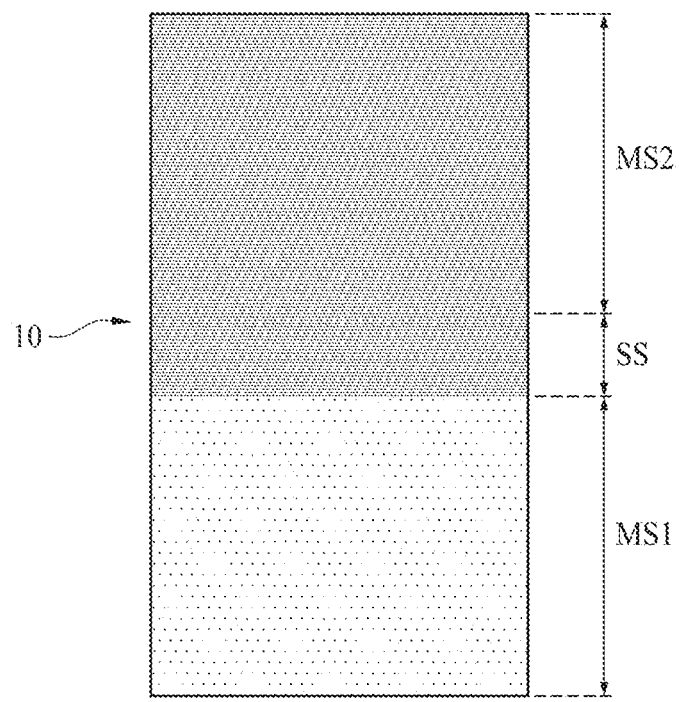
Figure 12C:
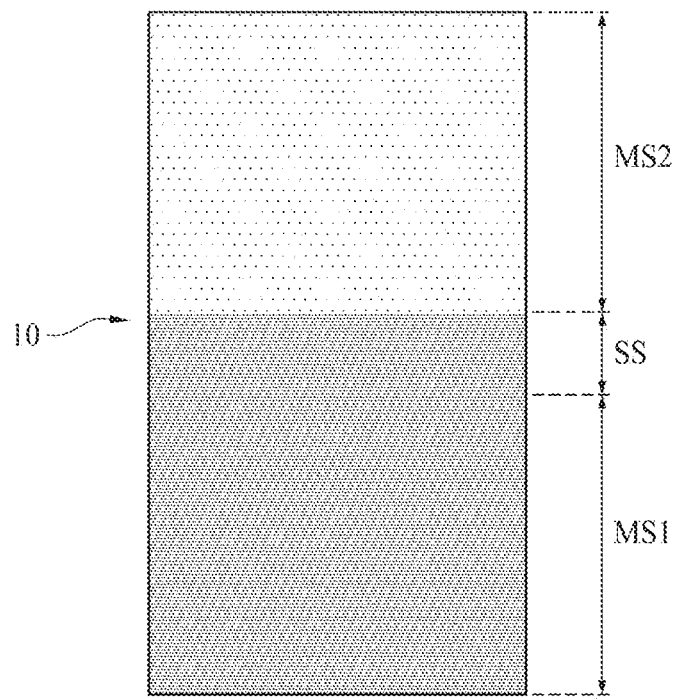
Figure 12D:
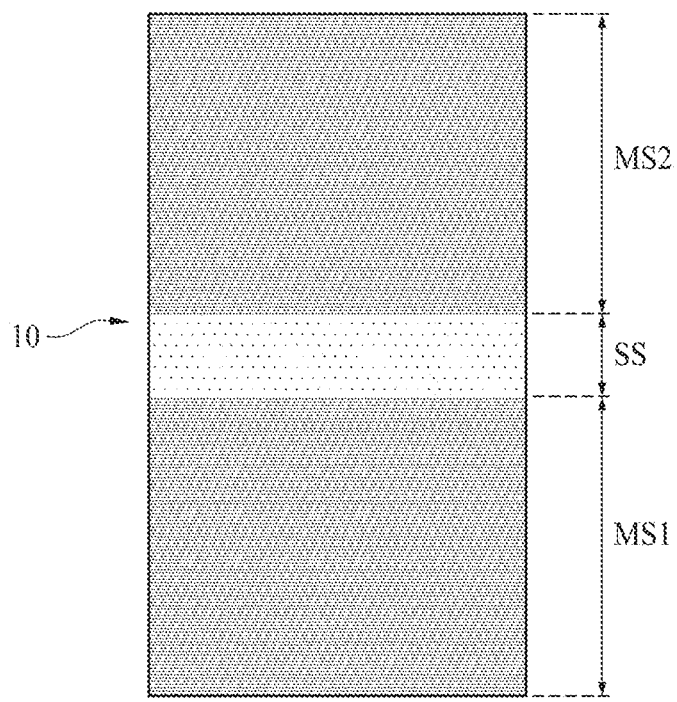

FIGS. 12A to 12D illustrate the luminance for each of the first and second main screens, and the sub screen for the driving mode of the LCD device, wherein FIG. 12A illustrates a luminance distribution in each of the first and second main screens, and the sub screen when the first and second main screens, and the sub screen are driven, FIG. 12B illustrates a luminance distribution in each of the first and second main screens, and the sub screen when only the first main screen is driven, FIG. 12C illustrates a luminance distribution in each of the first and second main screens, and the sub screen when only the second main screen is driven, and FIG. 12D illustrates a luminance distribution in each of the first and second main screens, and the sub screen when only the sub screen is driven.

As shown in FIG. 12A, when the first and second main screens (MS1, MS2), and the sub screen (SS) of the LCD device according to the embodiment of the present invention are driven, it shows the uniform luminance distribution in each of the first and second main screens (MS1, MS2), and the sub screen (SS) in accordance with the driving of each of the first, second, and third light source modules of the light source.

As shown in FIG. 12B, when only the first main screen (MS1) of the LCD device according to the embodiment of the present invention is driven, it shows the uniform luminance distribution of the first main screen (MS1) in accordance with the driving of the first light source module of the light source. Specifically, it is possible to prevent the dark point in the upper area of the first main screen (MS1) adjacent to the sub screen (SS). Accordingly, when only the first main screen (MS1) of the LCD device according to the embodiment of the present invention is driven, the dark point is not generated in the upper area of the first main screen (MS1), whereby it is possible to drive only the first main screen (MS1) by the driving of the first light source module of the light source, to thereby reduce power consumption for driving the first main screen (MS1).

As shown in FIG. 12C, when only the second main screen (MS2) of the LCD device according to the embodiment of the present invention is driven, it shows the uniform luminance distribution of the second main screen (MS2) in accordance with the driving of the third light source module of the light source. Specifically, it is possible to prevent the dark point in the lower area of the second main screen (MS2) adjacent to the sub screen (SS). Accordingly, when only the second main screen (MS2) of the LCD device according to the embodiment of the present invention is driven, the dark point is not generated in the lower area of the second main screen (MS2), whereby it is possible to drive only the second main screen (MS2) by the driving of the third light source module of the light source, to thereby reduce power consumption for driving the second main screen (MS2).

As shown in FIG. 12D, when only the sub screen (SS) of the LCD device according to the embodiment of the present invention is driven, it shows the uniform luminance distribution in the sub screen (SS) in accordance with the driving of the second light source module of the light source. Also, it is possible to prevent or minimize the light leakage of the sub screen (SS), which occurs when the light of the sub screen (SS) advances toward the first and second main screens (MS1, MS2). Accordingly, when only the sub screen (SS) of the LCD device according to the embodiment of the present invention is driven, it is possible to drive only the sub screen (SS) by the driving of the second light source module of the light source, to thereby reduce power consumption for the driving of the sub screen (SS). Also, it is possible to prevent the light leakage in the sub screen (SS), to thereby improve the luminance of the sub screen (SS).

As described above, in case of the LCD device 10 according to the embodiment of the present invention, the first to third light-emission portions 100a, 100b, and 100c of the light guiding plate 110 are individually driven to emit the light so that it is possible to realize the local dimming driving method for the first to third display areas (DA1, DA2, DA3) of the liquid crystal display panel 300. Especially, any one of the first to third display areas (DA1, DA2, DA3) is used as the sub screen so that it is possible to minimize the power consumption. Also, the LCD device 10 according to the embodiment of the present invention includes the plurality of first optical patterns (OP1) prepared in some area of the first light-emission portion 100a adjacent to the second light-emission portion 100b, at least one second optical pattern (OP2) prepared in the second light-emission portion 100b, and the plurality of third optical patterns (OP3) prepared in some area of the third light-emission portion 100c adjacent to the second light-emission portion 100b, whereby the first and third display areas (DA1, DA3) are driven as the main screen, and the second display area (DA2) disposed between the first and third display areas (DA1, DA3) is driven as the sub screen, thereby preventing the dark point in the upper area of the first display area (DA1) and the dark point in the lower area of the third display area (DA3), and improving the luminance in the second display area (DA2) by preventing the light leakage in the first and third display areas (DA1, DA3) when the second display area (DA2) is driven.

Figure 13:
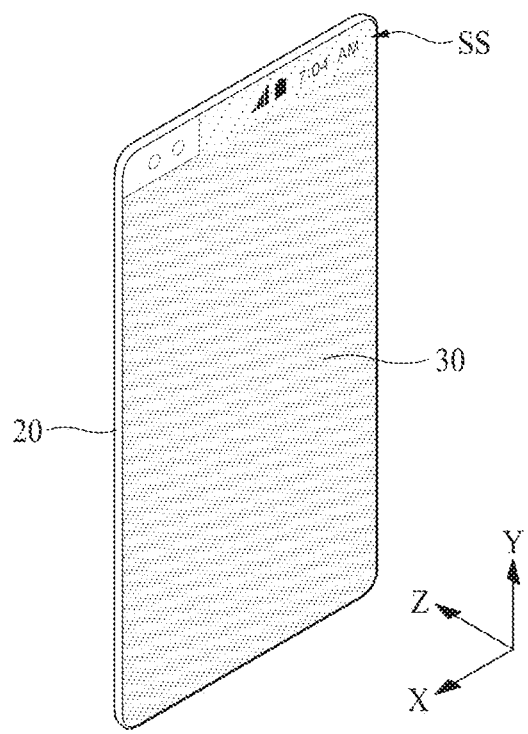
FIG. 13 illustrates an electronic device according to one embodiment of the present invention.

FIG. 13 illustrates an electronic device according to one embodiment of the present invention.

Referring to FIGS. 1 and 13, the electronic device according to one embodiment of the present invention may include an LCD device 10, a housing 20, and a cover window 30.

The LCD device 10 may include a liquid crystal display module having a backlight unit 100 and a liquid crystal display panel 300. The LCD device 100 is identical in structure to the LCD device shown in FIGS. 2 to 4, whereby a detailed description for the LCD device 100 will be omitted.

The housing 20 has a receiving space defined by a housing plate and a housing sidewall. That is, the housing 20 may have a case shape whose top is open. The housing 20 may be formed of a metal material or a plastic material. Herein, the housing 20 may be formed of a metal material for effectively radiating heat generated in the LCD device, for example, aluminum (Al), invar, or magnesium (Mg).

The receiving space is prepared on the housing plate surrounded by the housing sidewall, wherein the LCD device 10 is received in the receiving space.

At least one system receiving space may be prepared at a rear surface of the housing 20. The system receiving space may receive a battery of supplying a driving power, a communication module, a power circuit, a memory, a driving circuit, and a voltage generating circuit. The system receiving space is covered by a rear cover.

The housing sidewall is vertically prepared at each lateral side of the housing plate so as to prepare the receiving space on the housing plate. The housing sidewall supports the cover window 30, and directly covers each lateral surface of the LCD device 10.

The cover window 30 is supported by the housing 20 so as to cover the entire front surface of the liquid crystal display panel 300. The cover window 30 according to one embodiment of the present invention may be formed of tempered glass, transparent plastic, or a transparent film. In consideration of scratch or transparency, preferably, the cover window 30 according to one embodiment of the present invention includes the tempered glass.

The cover window 30 according to one embodiment of the present invention may be supported by an elastic member prepared in the housing sidewall.

Selectively, the cover window 30 is attached to the LCD device 10 by a transparent adhesive member, that is, attached to the entire front surface of the liquid crystal display panel 300, thereby supporting the LCD device 10 and protecting the liquid crystal display panel 300 from an external impact. In this case, the transparent adhesive member may include OCA (optical clear adhesive) or OCR (optical clear resin).

The electronic device according to one embodiment of the present invention may further include a guide frame for receiving the backlight unit 100 and supporting the liquid crystal display panel 300, wherein the guide frame is received in the receiving space of the housing 20. The guide frame is physically connected with the rear edge of the liquid crystal display panel 300 by the use of panel adhesive member, and is physically connected with the edge of the reflective sheet 150 by the use of sheet adhesive member. In this case, the panel adhesive member and the sheet adhesive member may be double-sided tape, thermo-curing resin, photo-curing resin, or double-sided adhesive foam pad.

As described above, the LCD device according to the embodiment of the present invention and the electronic device comprising the same include the sub screen and minimize the power consumption for driving the sub screen, and also minimize the power consumption for displaying the various sub images on the sub screen even though the main screen is turned-off.

Meanwhile, FIG. 13 shows a smart phone corresponding to the electronic device according to the embodiment of the present invention, but not limited to this type. For example, the electronic device according to the embodiment of the present invention may be applied to mobile electronic devices including the LCD device with the sub screen, television, notebook computer, monitor, camera, camcorder, or home appliances. Herein, the mobile electronic devices may be electronic notebook, electronic book, PMP (portable multimedia player), navigation, mobile phone, tablet PC (personal computer), smart watch, watch phone, wearable device, and mobile communication terminal.

It will be apparent to those skilled in the art that various modifications and variations can be made in the liquid crystal display device and electronic device comprising the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display (LCD) device, comprising:
a liquid crystal display panel; and
a backlight unit including a light guiding plate for guiding light from a light source toward the liquid crystal display panel,
wherein the light guiding plate includes:
a base member having a first light-emission portion, a second light-emission portion adjacent to the first light-emission portion, a first light-incidence surface at one side of the first light-emission portion, and a second light-incidence surface at one side of the second light-emission portion, the second light-incidence surface being unparallel with the first light-incidence surface in a plan view and having a smaller length than a length of the first light-emission portion in a direction parallel with the second light-incidence surface;
a first optical pattern part provided in a portion of the first light-emission portion adjacent to the second light-emission portion; and
a second optical pattern part provided in the second light-emission portion.

2. The liquid crystal display device according to claim 1, wherein the first optical pattern part includes a plurality of first optical patterns each extending in a direction parallel to the first light-incidence surface, and
wherein the second optical pattern part includes at least one second optical pattern which is parallel to the first optical patterns.

3. The liquid crystal display device according to claim 1, wherein the first optical pattern part includes a plurality of first optical patterns each extending in a direction parallel to the first light-incidence surface, and
wherein the first optical patterns have different sizes from one another such that one of the first optical patterns farther from the first light-incidence surface has a larger size than another of the first optical patterns closer to the first light-incidence surface.

4. The liquid crystal display device according to claim 3, wherein the one of the first optical patterns farther from the first light-incidence surface has one or both of a larger width and a larger height than the another of first optical patterns closer to the first light-incidence surface.

5. The liquid crystal display device according to claim 2, wherein each of the plurality of first optical patterns and the at least one second optical pattern is a prism pattern or a lenticular pattern.

6. The liquid crystal display device according to claim 1, wherein the light source includes:
a first light source module for emitting light to the first light-incidence surface; and
a second light source module configured to be driven independently of the first light source module for emitting light to the second light-incidence surface,
wherein each of the first and second light source modules includes a plurality of light emitting diodes.

7. The liquid crystal display device according to claim 1, wherein the base member includes:
a first light guiding portion having the first light-emission portion and the first light-incidence surface at one side of the first-light emission portion; and
a second light guiding portion protruding out from one side of the first light guiding portion opposite the first light-incidence surface, wherein the second light guiding portion includes the second light-emission portion and the second light-incidence surface at one side of the second light-emission portion.

8. The liquid crystal display device according to claim 7, wherein the display panel includes:
a first display area overlapped with the first light-emission portion; and
a second display area overlapped with the second light-emission portion.

9. The liquid crystal display device according to claim 7, wherein the base member further includes:
a third light guiding portion protruding out from the one side of the first light guiding portion opposite the first light-incidence surface, wherein the third light guiding portion is spaced apart from and parallel with the second light guiding portion, and includes a third light-emission portion and a third light-incidence surface facing the second light-incidence surface; and
a light source arrangement area between the second light guiding portion and the third light guiding portion,
wherein the light guiding plate further includes a third optical pattern part in the third light-emission portion.

10. The liquid crystal display device according to claim 9, wherein the light source includes:
a first light source module for emitting light to the first light-incidence surface;
a second light source module configured to be driven independently of the first light source module for emitting light to the second light-incidence surface; and
a third light source module configured to be driven independently of the first light source module for emitting light to the third light-incidence surface,
wherein the second light source module and the third light source module are disposed in the light source arrangement area, and
wherein each of the first to third light source modules includes a plurality of light emitting diodes.

11. The liquid crystal display device according to claim 9, wherein:
the first optical pattern part includes a plurality of first optical patterns each extending in a direction parallel to the first light-incidence surface,
the second optical pattern part includes at least one second optical pattern which is parallel to the first optical patterns, and
the third optical pattern part includes at least one third optical pattern which is parallel to the first optical patterns.

12. The liquid crystal display device according to claim 11, wherein each of the plurality of first optical patterns, the at least one second optical pattern, and the at least one third optical pattern is a prism pattern or a lenticular pattern.

13. The liquid crystal display device according to claim 9, wherein the display panel includes:
a first display area overlapped with the first light-emission portion;
a second display area overlapped with the second light-emission portion; and
a third display area overlapped with the third light-emission portion.

14. The liquid crystal display device according to claim 1, wherein the base member further includes a third light-emission portion adjacent to the second light-emission portion and discontiguous from the first light-emission portion, and a third light-incidence surface at one side of the third light-emission portion and parallel to the first light-incidence surface in the plan view, and wherein the second light-emission portion is disposed between the first light-emission portion and the third light-emission portion.

15. The liquid crystal display device according to claim 14, wherein the light source includes:
   a first light source module for emitting light to the first light-incidence surface;
   a second light source module configured to be driven independently of the first light source module for emitting light to the second light-incidence surface; and
   a third light source module configured to be driven independently of the first and second light source modules for emitting light to the third light-incidence surface,
   wherein each of the first to third light source modules includes a plurality of light emitting diodes.

16. The liquid crystal display device according to claim 14,
   wherein the first optical pattern part includes a plurality of first optical patterns each extending in a direction parallel to the first light-incidence surface,
   wherein the second optical pattern part includes at least one second optical pattern which is parallel to the first optical patterns, and
   wherein the light guiding plate further includes a third optical pattern part having a plurality of third optical patterns, the third optical patterns being provided in a portion of the third light-emission portion adjacent to the second light-emission portion and being parallel to the first optical patterns.

17. The liquid crystal display device according to claim 16,
   wherein one of the first optical patterns closer to the second light-emission portion has one or both of a larger width and a larger height than another of the first optical patterns farther from the second light-emission portion, and
   wherein one of the third optical patterns closer to the second light-emission portion has one or both of a larger width and a larger height than another of the third optical patterns farther from the second light-emission portion.

18. The liquid crystal display device according to claim 16, wherein each of the plurality of first optical patterns, the at least one second optical pattern, and the plurality of third optical patterns is a prism pattern or a lenticular pattern.

19. The liquid crystal display device according to claim 14, wherein the display panel includes:
   a first display area overlapped with the first light-emission portion;
   a second display area overlapped with the second light-emission portion; and
   a third display area overlapped with the third light-emission portion.

20. An electronic device comprising:
   a housing having a receiving space therein;
   a liquid crystal display module received in the receiving space; and
   a cover window for covering the liquid crystal display module, wherein the cover window is supported by the housing,
   wherein the liquid crystal display module includes a liquid crystal display device according to claim 1.

21. The liquid crystal display device of claim 1, wherein the second light-incidence surface is discontiguous from the first light-incidence surface.

22. The liquid crystal display device of claim 1, wherein the first light-emission portion includes:
   a pattern area, which is the portion of the first light-emission portion adjacent to the second light-emission portion; and
   a flat area between the first light-incidence surface and the pattern area, and
   wherein the first optical pattern part includes a plurality of optical patterns disposed only the pattern area and not in the flat area.

23. A liquid crystal display (LCD) device, comprising:
   a liquid crystal display panel; and
   a backlight unit including a light guiding plate for guiding light from a light source toward the liquid crystal display panel,
   wherein the light guiding plate includes:
      a base member having a first light-emission portion, a second light-emission portion adjacent to the first light-emission portion, a first light-incidence surface at one side of the first light-emission portion, and a second light-incidence surface at one side of the second light-emission portion and unparallel with the first light-incidence surface in a plan view; and
      a first optical pattern part provided in a portion of the first light-emission portion adjacent to the second light-emission portion and including a plurality of first optical patterns each extending in a direction parallel with the first light-incidence surface, the plurality of first optical patterns being increasingly larger in size farther away from the first light-incidence surface.

* * * * *